United States Patent [19]

Kojima et al.

[11] 4,443,534

[45] Apr. 17, 1984

[54] SILVER HALIDE PHOTOGRAPHIC ELEMENTS CONTAINING POLYMERS WHICH FILTER UV LIGHT

[75] Inventors: Tetsuro Kojima; Shingo Ishimaru; Naohiko Sugimoto; Tadashi Ikeda, all of Kanagawa, Japan

[73] Assignee: Fuji Photo Film Co., Ltd., Kanagawa, Japan

[21] Appl. No.: 484,331

[22] Filed: Apr. 12, 1983

[30] Foreign Application Priority Data

Apr. 14, 1982 [JP] Japan .................................. 57-61937

[51] Int. Cl.$^3$ .............................................. G03C 1/84
[52] U.S. Cl. .................................... 430/512; 430/507; 430/931
[58] Field of Search ................ 430/512, 931, 503, 507

[56] References Cited

U.S. PATENT DOCUMENTS

| | | | |
|---|---|---|---|
| 4,045,229 | 8/1977 | Weber et al. | 430/512 |
| 4,191,576 | 3/1980 | Fuseya et al. | 430/512 |
| 4,340,664 | 7/1982 | Monbaliu et al. | 430/512 |

*Primary Examiner*—Jack P. Brammer
*Attorney, Agent, or Firm*—Sughrue, Mion, Zinn, Macpeak & Seas

[57] ABSTRACT

A silver halide photographic light-sensitive material is disclosed. The material is comprised of a support having thereon a light-sensitive silver halide layer and a light-insensitive layer. The material may also contain other layers and one or more layers contains an ultraviolet ray absorbing polymer latex. The polymer latex is comprised of a homopolymer or a copolymer having a repeating unit derived from a monomer represented by the following general formula (I):

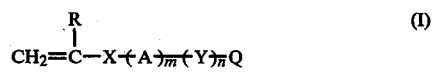

within the general formula (I) the Q represents an ultraviolet ray absorbing group represented by the general formula (II):

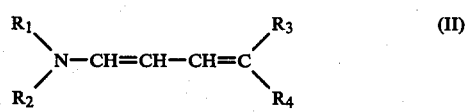

the substituents within the general formulae (I) and (II) are defined in a specification. The photographic light-sensitive material has excellent absorbing characteristic in the 300 to 400 nm range and does not cause static marks caused by ultraviolet layer. Furthermore, the material does not undergo discoloration. In addition, the photographic material has good film strength and a reduced layer thickness and provides a color image having an improved sharpness and which is free from fading and discoloration caused by light.

23 Claims, 6 Drawing Figures

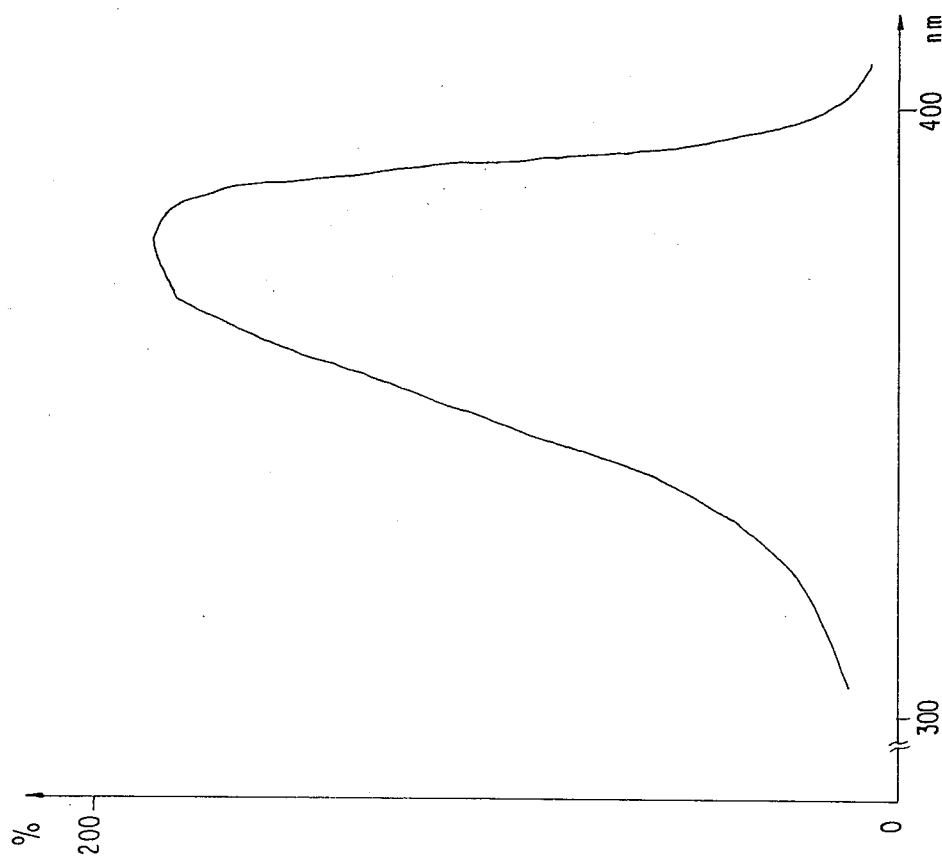
FIG. I(d)
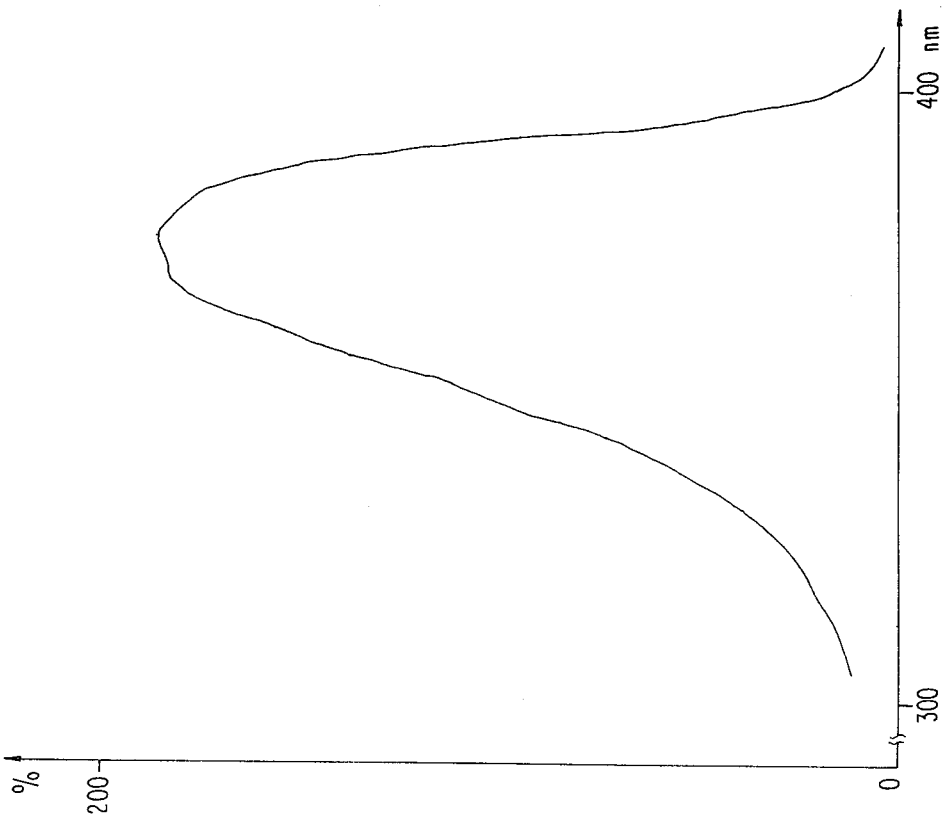
FIG. I(c)

SILVER HALIDE PHOTOGRAPHIC ELEMENTS CONTAINING POLYMERS WHICH FILTER UV LIGHT

FIELD OF THE INVENTION

The present invention relates to a silver halide photographic light-sensitive material and, particularly, to a process for preventing bad influences created by ultraviolet rays which comprises incorporating an ultraviolet ray absorbing polymer latex in a silver halide photographic light-sensitive material and to a silver halide photographic light-sensitive material wherein such an influence is prevented.

BACKGROUND OF THE INVENTION

It is well known that ultraviolet rays have a bad influence upon photographic light-sensitive materials. In the photographic light-sensitive materials, a light-sensitive photographic emulsions containing silver halide as a chief component is generally applied to a support having a relatively high electrical insulating property such as a film composed of triacetyl cellulose, polyethylene terephthalate, polystyrene or polycarbonate, or a laminated paper covered therewith, and the surface of the photographic light-sensitive materials has a fairly high electrical insulating property. Therefore, when the surface of the photographic light-sensitive material comes in contact with the same or different kind of material during production or treatment of the photographic light-sensitive material, electric charges are generated by friction or separation. This phenomenon is called charging. When accumulation of static electricity by charging reaches a certain limiting value, atmospheric discharge occurs at a particular moment and a discharge spark flys at the same time. When the photographic light-sensitive material is exposed to light by discharging, branched, feathered, spotted or radial images appear after development. Images formed by such a phenomenon are called static marks in the photographic field. It has been known that a distribution of spectral energy of this kind of discharge luminescence which causes static marks is in a range of 200 nm to 550 nm and, particularly, the intensity thereof is high in a range of 300 nm to 400 nm, and light energy in this range causes occurrence of static marks. Accordingly, attempts have been made to prevent the occurrence of static marks by shielding ultraviolet rays in a range of 300 to 400 nm by means of ultraviolet ray absorbing agents, as described in, for example, Japanese Patent Publication No. 10726/75 (corresponding to British Pat. No. 1,378,000 and German Pat. No. 2,163,904), Japanese Patent Application (OPI) No. 26021/76 (corresponding to Belgian Pat. No. 832,793) (the term "OPI" as used herein refers to a "published unexamined Japanese patent application") and French Pat. No. 2,036,679 (corresponding to Belgian Pat. No. 755,781), etc.

Further, excepting light-sensitive materials such as light-sensitive materials for printing which are exposed to a specific light source or light-sensitive materials for X-rays, etc., the conventional photographic light-sensitive materials are sometimes subject to an undesirable influence by ultraviolet rays included in light to be used for exposure. For example, in black-and-white light-sensitive materials, objects to be photographed which have a remarkably large quantity of spectral energy in an ultraviolet region, such as a snow scene, a seashore or the sky, etc., easily form soft tone images. In color light-sensitive materials, since it is desired to record only visible light, the influence of ultraviolet rays is very apparent. For example, when photographing the object which have a comparatively large quantity of spectral energy in the ultraviolet region, such as a distant view, a snow scene or an asphalted road, etc., the resulting color images are rich in cyan color. Further, color reproduction in color images is notably different according to light sources to be used for exposure, such as the sun, a tungsten lamp or a fluorescent lamp, etc. The cause of the difference is a difference of spectral energy in the ultraviolet region of light from these light sources. Namely, color images obtained by being exposed to light emitted from a tungsten lamp become more reddish and those obtained by being exposed to light emitted from a fluorescent lamp become more bluish than those obtained by being exposed to sunlight. Accordingly, in order to obtain color photographic images which have correct color reproduction, it is desirable to prevent ultraviolet rays from reaching the silver halide light-sensitive layer of the color light-sensitive material when photographing. Examples of attempts at such have been described in, for example, Japanese Patent Application (OPI) Nos. 56620/76 (corresponding to U.S. Pat. No. 4,045,229) and 49029/77 (corresponding to U.S. Pat. No. 4,200,464).

Furthermore, color photographs and, particularly, dye images formed on the light-sensitive emulsion layers by color development easily fade or discolor due to the action of ultraviolet rays. Color formers remaining in the emulsion layers after formation of color images are subject to the action of ultraviolet rays to form undesirable color stains on the finished photographs. This kind of action of ultraviolet rays on color photographs finished by photographic treatment is particularly remarkable with positive prints observed under sunlight containing a large quantity of ultraviolet rays. The fading and the discoloration of color images are easily caused by ultraviolet rays having wavelengths near the visible region, namely, those having spectral energy in the area of 300 nm to 400 nm. Examples of useful ultraviolet ray absorbing agents which act in reducing bad influences caused by these types of ultraviolet rays are described in U.S. Pat. Nos. 3,215,530, 3,707,375, 3,705,805, 3,352,681, 3,278,448, 3,253,921 and 3,738,837, Japanese Patent Publication Nos. 26138/74 and 25337/75, British Pat. No. 1,338,265 and Japanese Patent Application (OPI) No. 56620/76 (corresponding to U.S. Pat. No. 4,045,229), etc.

Hitherto, a number of ultraviolet ray absorbing agents have been proposed for one or more purposes as described above. However, ultraviolet ray absorbing agents used hitherto for silver halide photographic light-sensitive materials are not sufficiently suitable for the above described uses, because they color and form stains due to their insufficient stability to ultraviolet rays, heat and humidity. Further, they have inferior compatibility with binders, they diffuse into other layers caused bad influences due to substantial interlayer migration, or the emulsion thereof may be unstable causing deposition of crystals. Further, these ultraviolet ray absorbing agents have been frequently used in a surface protective layer of silver halide photographic light-sensitive materials, and when a high boiling point organic solvent is used for emulsification of the ultraviolet ray absorbing agents, the high boiling point organic solvent makes the layer soft and substantially deteriorate interlayer adhesion or anti-adhesive property. In order to prevent such problems, it is necessary to use a large amount of gelatin or to provide a gelatin protective layer on the layer. This results in thickening the layer containing the ultraviolet ray absorbing agent even though it is desirable to reduce the thickness of the layer.

An example of a type of ultraviolet ray absorbing agent which does not have such disadvantages is a polymer ultraviolet ray absorbing agent. However, such agents are insufficient for solving these problems.

As a result of extensive investigations, it has been found that these problems can be completely solved by using a polymer latex obtained by polymerization of certain kinds of ultraviolet ray absorbing monomers.

Two processes for adding polymer ultraviolet ray absorbing agents in the form of latex to a hydrophilic colloid composition are known. One process comprises adding a latex prepared by emulsion polymerization directly to a hydrophilic colloid. Another process comprises dispersing a hydrophobic polymer ultraviolet ray absorbing agent obtained by polymerization of ultraviolet ray absorbing monomers in an aqueous solution of gelatin in the form of latex. Such ultraviolet ray absorbing polymer latexes have been described in, for example, U.S. Pat. Nos. 3,761,272 and 3,745,010, Japanese Patent Application (OPI) No. 107835/78 and European Pat. No. 27242, etc.

The processes for adding the polymer ultraviolet ray absorbing agents in the form of latex to a hydrophilic colloid composition have many advantages as compared with other processes.

First, (1) it is not necessary to use a high boiling point organic solvent used hitherto, because a hydrophobic material is in the form of a latex, (2) strength of the film formed from the latex is not deteriorated, (3) it is possible to easily incorporate the ultraviolet ray absorbing agent in a high concentration in the hydrophilic colloid layer, because the latex can contain ultraviolet ray absorbing monomers in a high concentration, and (4) an increase of viscosity is small. Further, (5) other layers are not affected since they are completely immobilized, and (6) deposition of the ultraviolet ray absorbing agents in the hydrophilic colloid layer is small and the thickness of the hydrophilic colloid layer can be reduced. Particularly, when the ultraviolet ray absorbing polymer latex is produced by emulsion polymerization a specific method for dispersing is not required and the step of adding the ultraviolet ray absorbing agent to the coating solution can be simplified. However, though the ultraviolet ray absorbing polymer latexes known hitherto have several excellent advantages as described above, they have the following problems.

1. Since the absorption peak of the ultraviolet ray absorbing agent becomes broad, stains are formed or sensitivity of the silver halide emulsion is unnecessary reduced.

2. The absorption characteristic in a range of 300 nm to 400 nm is poor, and the effect of preventing static marks and color reproduction is inferior.

3. Since the ultraviolet ray absorbing agent itself is not sufficiently stable to ultraviolet rays, heat and humidity, it colors and causes stains.

4. Ultraviolet ray absorbing monomers have low solubility and poor polymerization ability.

5. It is necessary to add a large amount of the latex in order to obtain a desired density, because the ultraviolet ray absorbing monomers have a low absorption coefficient.

The broadening in the absorption peak of the ultraviolet ray absorbing agent having the absorption maximum in a range of about 360 nm to about 400 nm has a great influence upon the photographic properties. Such ultraviolet ray absorbing polymer latexes which absorb ultraviolet rays in the range of about 360 nm to about 400 nm are described in European Pat. No. 27242. However, these polymer latexes are still not sufficient since they have several disadvantages in that they have a bad influence upon the photographic properties, for example, the formation of stains or the decrease in the sensitivity of the silver halide emulsion due to the broadening in the absorption peak thereof, and in that the polymerization ability of the ultraviolet ray absorbing monomers used is very poor, etc.

SUMMARY OF THE INVENTION

Therefore, an object of the present invention is to provide a silver halide photographic light-sensitive material containing a novel ultraviolet ray absorbing polymer latex having excellent absorption characteristics in a range of 300 nm to 400 nm which does not cause static marks, deterioration of color reproduction, and fading or discoloration of color images caused by ultraviolet rays.

Another object of the present invention is to provide a silver halide photographic light-sensitive material containing a novel ultraviolet ray absorbing polymer latex which does not have a bad influence by diffusion into other layers due to very small interlayer migration.

A still another object of the present invention is to provide a silver halide photographic light-sensitive material containing a novel ultraviolet ray absorbing polymer latex which is sufficiently stable to ultraviolet rays, heat and humidity.

A further object of the present invention is to provide a silver halide photographic light-sensitive material containing a novel ultraviolet ray absorbing polymer latex having high film strength which does not influence film properties such as adhesion.

A further object of the present invention is to provide a silver halide photographic light-sensitive material containing a novel ultraviolet ray absorbing polymer latex, wherein the layer thickness is thin and the resulting images have improved sharpness.

A still further object of the present invention is to provide a silver halide photographic light-sensitive material containing a novel ultraviolet ray absorbing polymer latex which does not have a bad influence upon photographic properties such as sensitivity or fog, etc.

Other objects of the present invention will be apparent from the following detailed description and examples.

As a result of extensive investigations, it has now been found that these objects of the present invention are attained by using an ultraviolet ray absorbing polymer latex which is a homopolymer or a copolymer having a repeating unit derived from a monomer represented by the general formula (I) described below. More specifically, it has been found that they can be attained by a silver halide photographic light-sensitive material comprising a support having thereon at least one light-sensitive silver halide emulsion layer and at least one light-sensitive layer, the photographic light-sensitive material containing an ultraviolet ray absorbing polymer latex which is a homopolymer or a copolymer having a repeating unit derived from a monomer represented by the following general formula (I):

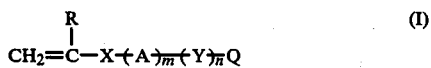

wherein R represents a hydrogen atom, a lower alkyl group having from 1 to 4 carbon atoms (for example, a methyl group, an ethyl group, an n-propyl group, an isopropyl group or an n-butyl group, etc.). or a chlorine atom; X represents —CONH—, —COO— or a phenylene group; A represents a linking group selected from an alkylene group having from 1 to 20 carbon atoms (for example, a methylene group, an ethylene group, a trimethylene group, a 2-hydroxytrimethylene group, a pentamethylene group, a hexamethylene group, an ethylethylene group, a propylene group or a decamethylene group, etc.) or an arylene group having from 6 to 20 carbon atoms (for example, a phenylene group, etc.); Y represents —COO—, —OCO—, —CONH—, —NHCO—, —SO$_2$NH—, —NHSO$_2$—, —SO$_2$— or —O—; m represents 0 or an integer of 1; n represents 0 or an integer of 1; and Q represents an ultraviolet ray absorbing group represented by the following general formula (II):

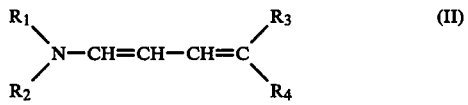

wherein $R_1$ and $R_2$, which may be the same or different, each represents a hydrogen atom, an alkyl group having from 1 to 20 carbon atoms (for example, a methyl group, an ethyl group, an n-butyl group, an n-hexyl group, a cyclohexyl group, an n-decyl group, an n-dodecyl group, an n-octadecyl group, an eicosyl group, a methoxyethyl group, an ethoxypropyl group, a 2-ethylhexyl group, a hydroxyethyl group, a chloropropyl group, an N,N-diethylaminopropyl group, a cyanoethyl group, a phenethyl group, a benzyl group, a p-tert-butylphenethyl group, a p-tert-octylphenoxyethyl group, a 3-(2,4-di-tert-amylphenoxy)-propyl group, an ethoxycarbonylmethyl group, a 2-(2-hydroxyethoxy)ethyl group, a 2-furylethyl group, etc.) or an aryl group having from 6 to 20 carbon atoms (for example, a tolyl group, a phenyl group, an anisyl group, a mesityl group, a chlorophenyl group, a 2,4-di-tert-amylphenyl group, a naphthyl group, etc.) provided that the both of $R_1$ and $R_2$ do not simultaneously represent hydrogen atoms, and further $R_1$ and $R_2$ may combine to form an atomic group necessary to form a cyclic amino group (for example, a piperidino group, a morpholino group, a pyrrolidino group, a hexahydroazepino group, a piperazino group, etc.); $R_3$ represents a cyano group, —COOR$_5$, —CONHR$_5$, —COR$_5$ or —SO$_2$R$_5$; and $R_4$ represents a cyano group, —COOR$_6$, —CONHR$_6$, —COR$_6$ or —SO$_2$R$_6$, wherein $R_5$ and $R_6$ each represents an alkyl group having from 1 to 20 carbon atoms or an aryl group having from 6 to 20 carbon atoms, each having the same meanings as those for $R_1$ and $R_2$, and further $R_5$ and $R_6$ may combine to form an atomic group necessary to form a 1,3-dioxocyclohexane ring (for example, a dimedone ring, a 1,3-dioxo-5,5-diethylcyclohexane ring, etc.), a 1,3-diaza-2,4,6-trioxocyclohexane ring (for example, a barbituric acid ring, a 1,3-dimethylbarbituric acid ring, a 1-phenyl-barbituric acid ring, a 1-methyl-3-octylbarbituric acid ring, a 1-ethyl-3-octyloxycarbonylethylbarbituric acid ring, etc.), a 1,2-diaza-3,5-dioxocyclopentane ring (for example, a 1,2-diaza-1,2-dimethyl-3,5-dioxocyclopentane ring, a 1,2-diaza-1,2-diphenyl-3,5-dioxocyclopentane ring, etc.) or a 2,4-diaza-1-alkoxy-3,5-dioxocyclohexene ring (for example, a 2,4-diaza-1-ethoxy-4-ethyl-3,5-dioxocyclohexene ring, a 2,4-diaza-1-ethoxy-4-[3-(2,4-di-tert-amylphenoxy)propyl]-3,5-dioxocyclohexene ring, etc.); and at least one of $R_1$, $R_2$, $R_3$ and $R_4$ bonds to the vinyl group through the above-described linking group.

DETAILED DESCRIPTION OF THE INVENTION

Figure 1A:
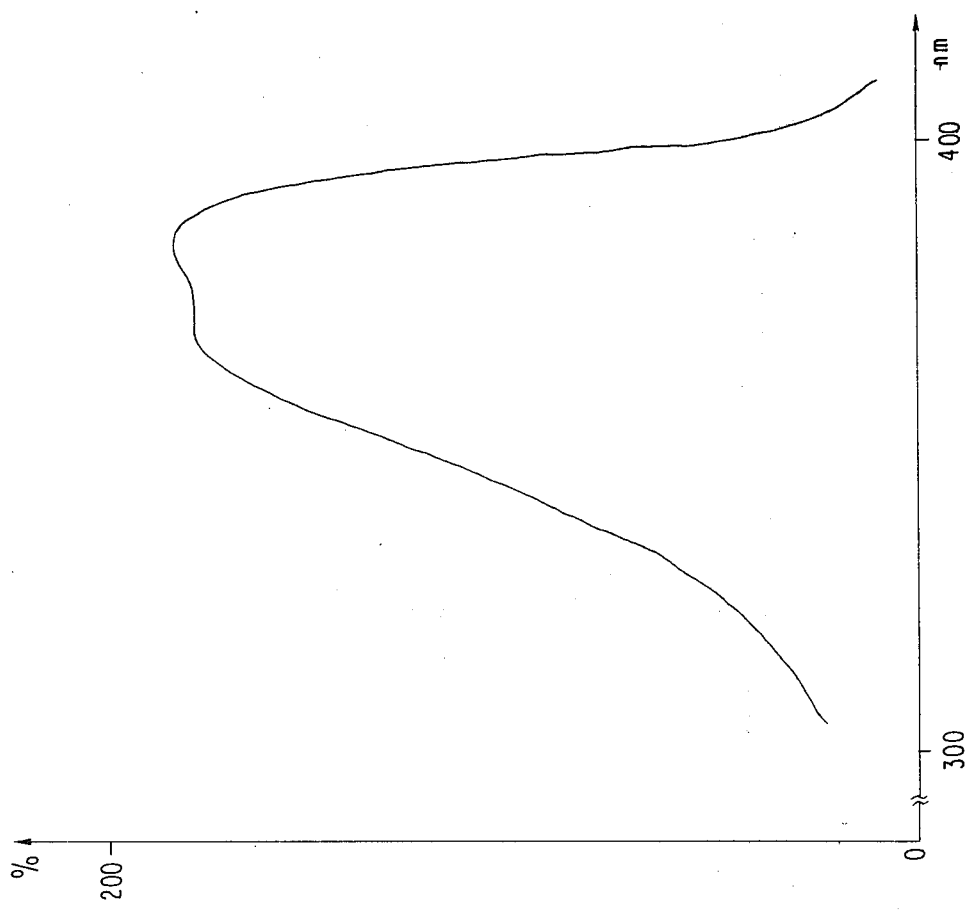
FIGS. 1 (a), (b), (c) and (d) and FIGS. 2 (e) and (f) each indicates a spectral absorption curve, wherein the abscissa means absorption wavelength (unit: nm) and the ordinate means absorbance (%).

Of the compounds represented by the general formula (II), those wherein $R_1$ and $R_2$ each represents an alkyl group having from 1 to 20 carbon atoms (preferably from 1 to 6 carbon atoms), $R_3$ represents a cyano group or —SO$_2$R$_5$, $R_4$ represents a cyano group or —COOR$_6$, and $R_5$ and $R_6$ each represents an alkyl group having from 1 to 20 carbon atoms (preferably from 1 to 6 carbon atoms) or an aryl group having from 6 to 20 carbon atoms are preferred.

Of the compounds represented by the general formula (II), those wherein $R_1$ and $R_2$ each represents an alkyl group having from 1 to 6 carbon atoms, $R_3$ represents —SO$_2$R$_5$, $R_4$ represents —COOR$_6$, $R_5$ represents a phenyl group which may be substituted (for example, a phenyl group, a tolyl group, etc.), and $R_6$ represents an alkyl group having from 1 to 20 carbon atoms (preferably from 1 to 6 carbon atoms) are particularly preferred.

Examples of monomers (comonomers) used for copolymerizing with the ultraviolet ray absorbing monomer include an ester, preferably a lower alkyl ester, and an amide, derived from an acrylic acid, for example, an acrylic acid, an α-chloroacrylic acid, an α-alkylacrylic acid such as methacrylic acid, etc. (for example, acrylamide, methacrylamide, tert-butylacrylamide, methyl acrylate, methyl methacrylate, ethyl acrylate, ethyl methacrylate, n-propyl acrylate, n-butyl acrylate, 2-ethylhexyl acrylate, n-hexyl acrylate, octyl methacrylate, lauryl methacrylate and methylenebisacrylamide, etc.), a vinyl ester (for example, vinyl acetate, vinyl propionate and vinyl laurate, etc.), acrylonitrile, methacrylonitrile, an aromatic vinyl compound (for example, styrene and a derivative thereof such as vinyl toluene, divinylbenzene, vinylacetophenone, sulfostyrene and styrenesulfinic acid, etc.), itaconic acid, citraconic acid, crotonic acid, vinylidene chloride, a vinyl alkyl ether (for example, vinyl ethyl ether, etc.), an ester of maleic acid, N-vinyl-2-pyrrolidone, N-vinylpyridine and 2- and 4-vinylpyridine, etc.

Of these monomers it is particularly preferable to use an ester of acrylic acid, an ester of methacrylic acid and an aromatic vinyl compound.

Two or more of the above-described comonomer compounds may be used together. For example, it is possible to use a combination of n-butyl acrylate and divinylbenzene, styrene and methyl methacrylate, methyl acrylate and methacrylic acid, etc.

The ethylenically unsaturated monomer which is used to copolymerize with the ultraviolet ray absorbing monomer corresponding to the above-described general formula (I) can be selected so as to have a good influence upon physical properties and/or chemical properties of the copolymer to be prepared, for example, solubility, compatibility with a binder such as gelatin in the photographic colloid composition or other photographic additives, for example, known photographic ultraviolet ray absorbing agents, known photographic antioxidants and known color image forming agents, flexibility and thermal stability thereof, etc.

The ultraviolet ray absorbing polymer latex used in the present invention may be prepared by an emulsion polymerization method as described above or may be prepared by dissolving a hydrophobic polymer ultraviolet ray absorbing agent obtained by polymerization of an ultraviolet ray absorbing monomer in an organic solvent and then dispersing the solution in a latex form in an aqueous solution of gelatin.

These methods can be applied to the preparation of homopolymers and formation of copolymers. In the latter case, it is preferred that a comonomer is liquid, because they function as a solvent for the ultraviolet ray absorbing monomer which is solid in a normal state when carrying out emulsion polymerization.

Free radical polymerization of an ethylenically unsaturated solid monomer is initiated with the addition of a free radical which is formed by thermal decomposition of a chemical initiator, an action of a reducing agent to an oxidizing compound (a redox initiator) or a physical action such as irradiation of ultraviolet rays or other high energy radiations, high frequencies, etc.

Examples of principal chemical initiators include a persulfate (for example, ammonium persulfate or potassium persulfate, etc.), hydrogen peroxide, a peroxide (for example, benzoyl peroxide or chlorobenzoyl peroxide, etc.) and an azonitrile compound (for example, 4,4'-azobis(4-cyanovaleric acid) and azobisisobutyronitrile, etc.), etc.

Examples of conventional redox initiators include hydrogen-iron (II) salt, potassium persulfate-potassium bisulfate and cerium salt-alcohol, etc.

Examples of the initiators and the functions thereof are described in F. A. Bovey, *Emulsion Polymerization*, issued by Interscience Publishers Inc., New York, 1955, pages 59–93.

As an emulsifier which can be used in the emulsion polymerization, a compound having surface activity is used. Preferred examples thereof include soap, a sulfonate, a sulfate, a cationic compound, an amphoteric compound and a high molecular weight protective colloid. Specific examples of the emulsifiers and the functions thereof are described in *Belgische Chemissche Industrie*, Vol. 28, pages 16–20 (1963).

On the other hand, when dispersing the hydrophobic polymer ultraviolet ray absorbing agent in an aqueous solution of gelatin in the form of latex, an organic solvent used for dissolving the hydrophobic polymer ultraviolet ray absorbing agent is removed from the mixture prior to coating of the dispersion or by volatilization during drying of the dispersion coated, although the latter is less preferable.

As the solvents, there are those which have a certain degree of water solubility so as to be capable of being removed by washing with water in a gelatin noodle state and those which can be removed by spray drying, vacuum or steam purging.

Further, examples of the organic solvents capable of being removed include an ester (for example, a lower alkyl ester, etc.), a lower alkyl ether, a ketone, a halogenated hydrocarbon (for example, methylene chloride, trichloroethylene, etc.), a fluorinated hydrocarbon, an alcohol (for example, an alcohol from n-butyl alcohol to octyl alcohol) and a combination thereof.

Any type of dispersing agent can be used in the dispersion of the hydrophobic polymer ultraviolet ray absorbing agent. But ionic surface active agents, and particularly anionic surface active agents are preferred.

Further, it is possible to use ampholytic surface active agents such as C-cetylbetaine, an N-alkylaminopropionate or an N-alkyliminodipropionate, etc.

In order to increase the dispersion stability and to improve the flexibility of the emulsion coated, a small amount (not more than 50% by weight of the ultraviolet ray absorbing polymer) of a permanent solvent, namely, a water-immiscible organic solvent having a high boiling point (i.e., above 200° C.), for example, dibutyl phosphate, tricresyl phosphate or etc., may be added. It is necessary for the concentration of the permanent solvent to be sufficiently low in order to plasticize the polymer while it is kept in a state of a solid particle. Furthermore, when using the permanent solvent, it is preferred that the amount thereof is as small as possible so as to decrease the thickness of the final emulsion layer or the hydrophilic colloid layer in order to maintain good sharpness.

It is preferred that the amount of the ultraviolet ray absorbing agent portion (monomer represented by the general formula (I)) in the ultraviolet ray absorbing polymer latex according to the present invention is generally from 5% to 100% by weight, and an amount of from 50% to 100% by weight is particularly preferred from the viewpoint of the thickness of the layer and stability.

In the following, typical examples of the ultraviolet ray absorbing monomers represented by the general formula (I) of the present invention are set forth, but the present invention is not to be construed as being limited thereto.

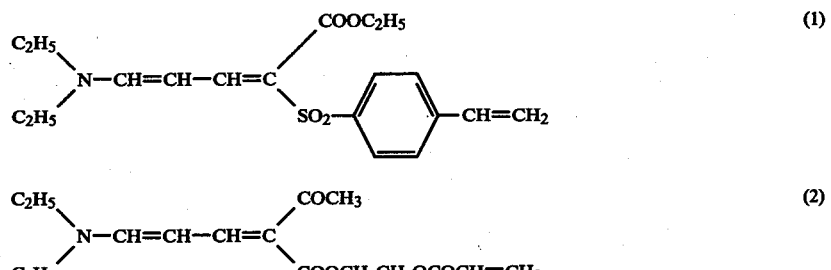

-continued
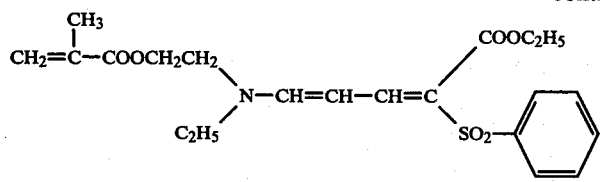 (3)
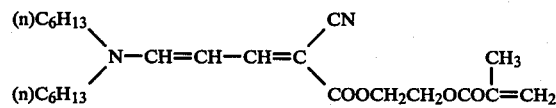 (4)
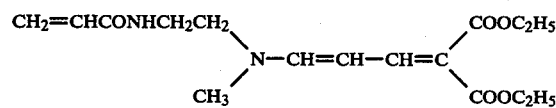 (5)
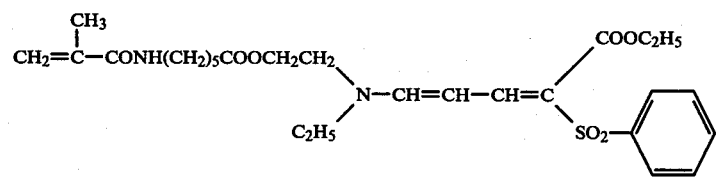 (6)
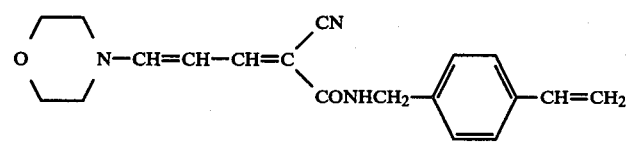 (7)
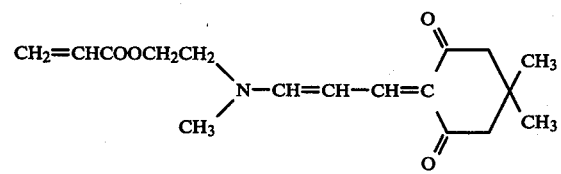 (8)
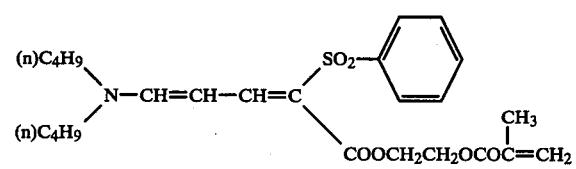 (9)
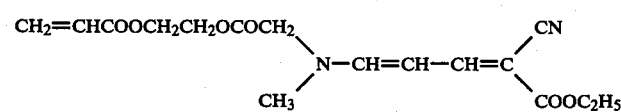 (10)
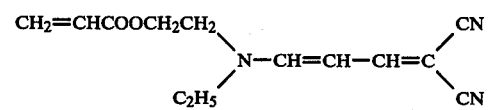 (11)
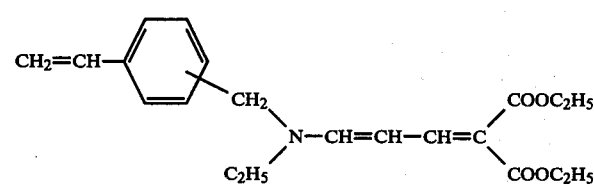 (12)

-continued
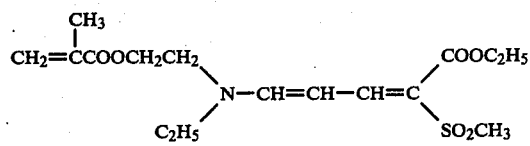 (13)
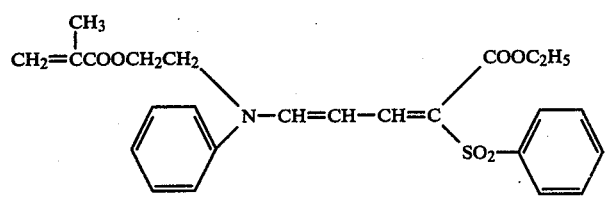 (14)
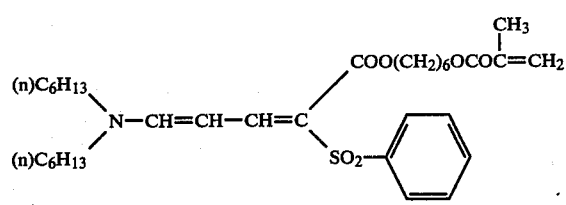 (15)
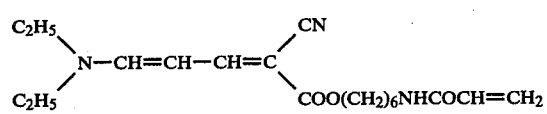 (16)
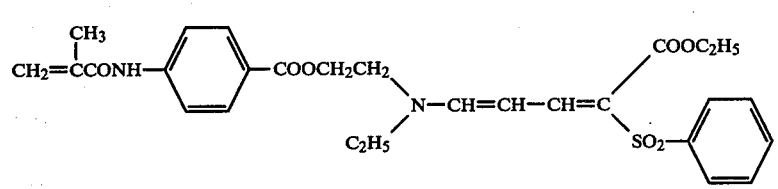 (17)
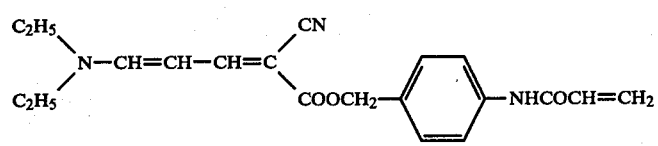 (18)
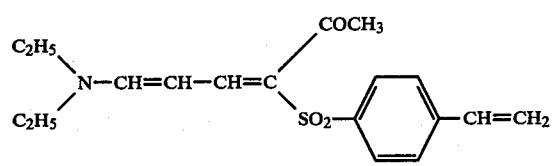 (19)
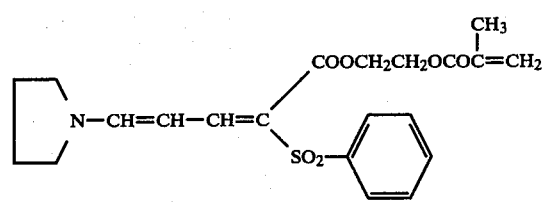 (20)
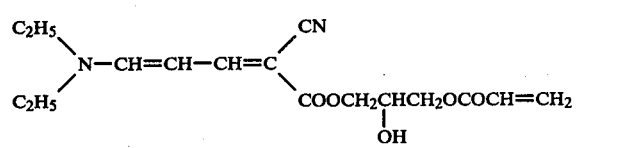 (21)
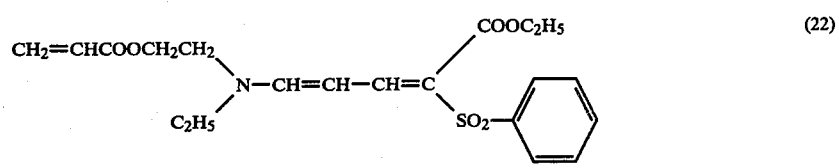 (22)

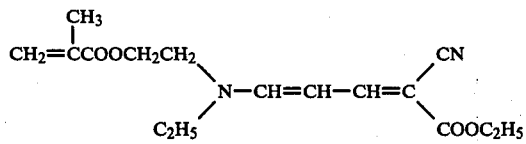
(23)

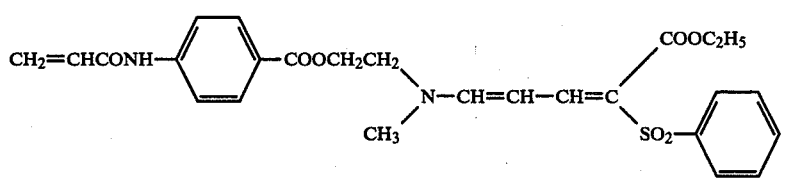
(24)

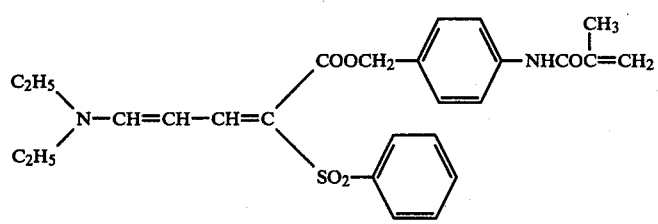
(25)

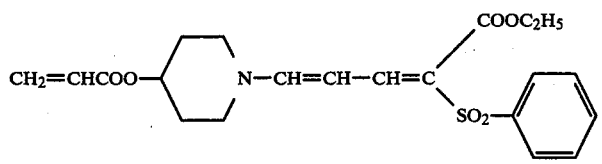
(26)

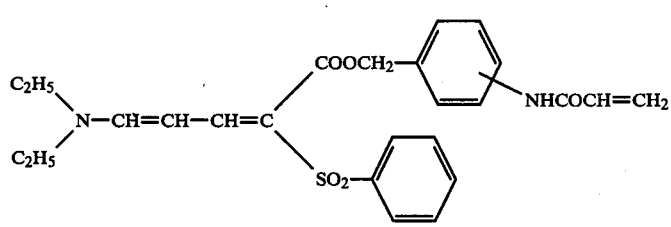
(27)

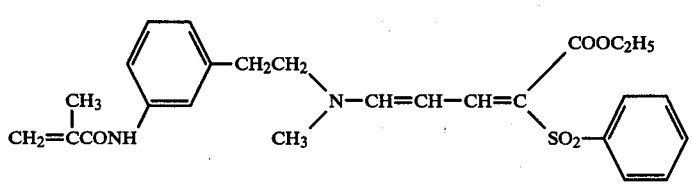
(28)

Preferred examples of the ultraviolet ray absorbing monomers represented by the general formula (I) include Compounds (1), (3) and (11).

Specific examples of the ultraviolet ray absorbing polymer latexes which can be used in the present invention are set forth below, but the present invention is not to be construed as being limited thereto.

P-1 to P-28: Homopolymers of the above Compounds (1) to (28)

P-29: Copolymer of Compound (1): methyl methacrylate = 8:2 (ratio by weight)

P-30: Copolymer of Compound (1): methyl methacrylate = 5:5

P-31: Copolymer of Compound (1): methyl methacrylate = 5:1

P-32: Copolymer of Compound (1): styrene = 7:3

P-33: Copolymer of Compound (1): methyl acrylate = 5:5

P-34: Copolymer of Compound (11): n-butyl acrylate = 7:3

P-35: Copolymer of Compound (1): n-butyl acrylate = 5:5

P-36: Copolymer of Compound (3): methyl methacrylate = 7:3

P-37: Copolymer of Compound (3): methyl acrylate = 5:5

P-38: Copolymer of Compound (6): methyl methacrylate = 8:2

P-39: Copolymer of Compound (6): styrene = 7:3

P-40: Copolymer of Compound (21): methyl methacrylate = 7:3

P-41: Copolymer of Compound (21): styrene = 7:3

P-42: Copolymer of Compound (17): methyl methacrylate = 7:3

The ultraviolet ray absorbing monomers corresponding to the general formula (I) can be synthesized by reacting a compound synthesized by the process described, for example, in U.S. Pat. No. 4,195,999, Japanese Patent Application (OPI) No. 56620/76 (corresponding to U.S. Pat. No. 4,045,229), etc., with an acid halide of acrylic acid or an α-substituted acrylic acid such as acryloyl chloride or methacryloyl chloride, or can be synthesized by a reaction with hydroxyethyl acrylate, hydroxyethyl methacrylate, glycidyl methacrylate, methylolacrylamide, etc.

Typical examples of syntheses of the compounds used in the present invention are set forth below.

[A] SYNTHESES OF MONOMER COMPOUNDS

Synthesis Example 1

Synthesis of Compound (1)

45 g of 3-anilinoacroleinanil and 51 g of ethyl (4-vinylphenyl)sulfonyl acetate were heated at 85° to 90° C. for 2 hours in 50 ml of acetic anhydride under nitrogen atmosphere. After removing the acetic anhydride under a reduced pressure, 250 ml of ethyl alcohol and 73 g of diethylamine were added to the residue and the mixture was refluxed for 2 hours. The reaction solution was poured into ice water and the light yellow precipitates thus-formed were separated and recrystallized from 300 ml of ethyl alcohol to obtain 58 g of the desired compound having a melting point of 117° to 118° C.

$$\lambda_{max}^{CH_3COOC_2H_5} = 372 \text{ nm}$$

Identification of the compound was carried out using IR spectrum, NMR spectrum and elemental analysis.

Elemental Analysis for $C_{19}H_{25}NO_4S$ Calculated (%): H: 6.93 C: 62.78 N: 3.85 Found (%): H: 6.88 C: 62.87 N: 3.80

Synthesis Example 2

Synthesis of Compound (3)

29 g of 3-anilinoacroleinanil and 30 g of ethylphenylsulfonyl acetate were heated at 85° to 90° C. for 2 hours in 30 ml of acetic anhydride. Then, the acetic anhydride was removed under a reduced pressure, to the residue were added 200 ml of ethyl alcohol and 12 g of ethyl hydroxyethylamine and the mixture was refluxed for 2 hours. The reaction solution was poured into ice water and the light yellow precipitates thus-formed were separated and recrystallized from ethyl acetate to obtain 36 g of ethyl-5-(N-ethyl-N-hydroxyethylamino)-2-phenylsulfonyl-2,4-pentadienoate having a melting point of 107° C.

30 g of the compound thus obtained and 7 ml of pyridine were dissolved in 100 ml of acetonitrile and to the solution was added dropwise 16 g of methacryl chloride. The mixture was reacted for 2 hours while maintaining the reaction temperature below 40° C. Then, the acetonitrile was distilled off, and the residue was passed through a chromatographic column with Kieselgel 60 (manufactured by Merck Co.) and the n-hexane-ethyl acetate effluent was collected. The solvent was distilled off and 25 g of the desired oily compound was obtained.

$$\lambda_{max}^{CH_3COOC_2H_5} = 372 \text{ nm}$$

Identification of the compound was carried out using IR spectrum, NMR spectrum and elemental analysis.

Elemental Analysis for $C_{21}H_{27}NO_6S$ Calculated (%): H: 6.46 C: 59.84 N: 3.32 Found (%): H: 6.54 C: 59.71 N: 3.35

Synthesis Example 3

Synthesis of Compound (11)

195 g of 3-anilinoacroleinanil and 53 g of malononitrile were heated at 85° to 90° C. for 2 hours in 200 ml of acetic anhydride. The acetic anhydride was then removed under a reduced pressure, to the residue were added 300 ml of ethyl alcohol and 100 g of ethyl hydroxyethylamine and the mixture was refluxed for 2 hours. The reaction solution was poured into ice water and the light yellow precipitates thus-formed were separated and recrystallized from ethyl acetate to obtain 131 g of ethyl hydroxyethylaminoallylidenemalononitrile having a melting point of 88° to 90° C.

96 g of the compound thus-obtained and 45 ml of pyridine were dissolved in 500 ml of acetonitrile and to the solution was added dropwise 46 g of acryloyl chloride. The mixture was reacted for 2 hours while maintaining the reaction temperature below 40° C. Then, the reaction solution was poured into 1 liter of ice water and the light yellow precipitates thus-formed were separated and recrystallized from ethyl acetate to obtain 85 g of the desired compound having a melting point of 75° to 76° C.

$$\lambda_{max}^{CH_3COOC_2H_5} = 378 \text{ nm}$$

Identification of the compound was carried out using IR spectrum, NMR spectrum and elemental analysis.

Elemental Analysis for $C_{13}H_{15}N_3O_2$ Calculated (%): H: 6.16 C: 63.66 N: 17.13 Found (%): H: 6.09 C: 63.77 N: 17.09

[B] SYNTHESES OF POLYMER COMPOUNDS

Synthesis Example 4

Synthesis of Homopolymer Latex of Compound (3)

500 ml of an aqueous solution containing 10 g of sodium salt of oleylmethyltauride dissolved was heated to 90° C. while gradually introducing nitrogen gas therethrough under stirring. To the resulting mixture, 20 ml of an aqueous solution containing 350 mg of potassium persulfate was added. Then, a solution prepared by dissolving 50 g of ultraviolet ray absorbing monomer (3) in 200 ml of ethanol by heating was added thereto. After the completion of the addition, the mixture was stirred for 1 hour while heating at 85° to 90° C. and 10 ml of an aqueous solution containing 150 mg of potassium persulfate was added thereto. After the reaction was further carried out for 1 hour, the ethanol was distilled off as an azeotropic mixture with water. The latex thus formed was cooled. After the pH was adjusted to 6.0 with a 1 N sodium hydroxide solution, the latex was filtered. The concentration of the polymer in the latex was 8.13%. Further, the latex had an absorption maximum at 377 nm in the aqueous system.

Synthesis Example 5

Synthesis of Copolymer Latex of Compound (1) and Methyl Methacrylate 7 liters of an aqueous solution containing 150 g of sodium salt of oleylmethyltauride dissolved was heated to 90° C. while gradually introducing nitrogen gas therethrough under stirring. To the resulting mixture, 100 ml of an aqueous solution containing 5.6 g of potassium persulfate was added. Then, 600 g of ultraviolet ray absorbing monomer (1) and 120 g of methyl methacrylate were dissolved in 1 liter of ethanol, and the resulting solution was added to the mixture. After the completion of the addition, the mixture was stirred for 1 hour while heating at 85° to 90° C., and 30 ml of an aqueous solution containing 2.2 g of potassium persulfate was added thereto. After the reaction was further carried out for 1 hour, the ethanol and the methyl methacrylate not reacted were distilled off as an azeotropic mixture with water. The latex thus-formed was cooled. After the pH was adjusted to 6.0 with a 1 N sodium hydroxide solution, the latex was filtered. The concentration of the copolymer in the latex was 10.03%. As a result of nitrogen analysis it was found that the copolymer synthesized contained 76.7% of the ultraviolet ray absorbing monomer unit. Further, the latex had an absorption maximum at 381 nm in the aqueous system.

Synthesis Example 6

Synthesis of Copolymer Latex of Compound (11) and n-Butyl Acrylate 800 ml of an aqueous solution containing 15 g of sodium salt of oleylmethyltauride dissolved was heated to 90° C. while gradually introducing nitrogen gas therethrough under stirring. To the resulting mixture, 20 ml of an aqueous solution containing 525 mg of potassium persulfate was added. Then, 50 g of ultraviolet ray absorbing monomer (11) and 25 g of n-butyl acrylate were dissolved in 200 ml of ethanol with heating, and the resulting solution was added to the mixture. After the completion of the addition, the mixture was stirred for 1 hour with heating at 85° to 90° C. and 10 ml of an aqueous solution containing 225 mg of potassium persulfate was added thereto. After the reaction was further carried out for 1 hour, the ethanol and the n-butyl acrylate not reacted were distilled off as an azeotropic mixture with water. The latex thus-formed was cooled. After the pH was adjusted to 6.0 with a 1 N sodium hydroxide solution, the latex was filtered. The concentration of the copolymer in the latex was 9.34%. As a result of nitrogen analysis it was found that the copolymer synthesized contained 63.1% of the ultraviolet ray absorbing monomer unit. Further, the latex had an absorption maximum at 382 nm in the aqueous system.

Synthesis Example 7

Synthesis of Copolymer Latex of Compound (3) and Methyl Methacrylate 1 liter of an aqueous solution containing 15 g of sodium salt of oleylmethyltauride dissolved was heated to 90° C. while gradually introducing nitrogen gas therethrough under stirring. To the resulting mixture, 20 ml of an aqueous solution containing 225 mg of potassium persulfate was added. Then, 10 g of methyl methacrylate was added thereto, and the mixture was stirred for 1 hour while heating at 85° to 90° C. to synthesize latex (a). Then, to the resulting latex (a), a solution prepared by dissolving 50 g of ultraviolet ray absorbing monomer (3) and 20 g of methyl methacrylate in 200 ml of ethanol was added and thereafter 20 ml of an aqueous solution containing 300 mg of potassium persulfate was added. After the reaction was further carried out for 1 hour, 20 ml of an aqueous solution containing 225 mg of potassium sulfate was added. After subsequently carrying out the reaction for 1 hour, the ethanol and the methyl methacrylate not reacted were distilled off as an azeotropic mixture with water. The latex thus-formed was cooled. After the pH was adjusted to 6.0 with a 1 N sodium hydroxide solution, the latex was filtered. The concentration of the copolymer in the latex was 8.55%. As a result of nitrogen analysis it was found that the copolymer synthesized contained 61.8% of the ultraviolet ray absorbing monomer unit. Further, the latex had an absorption maximum at 376 nm in the aqueous system.

Synthesis Example 8

Synthesis of Hydrophobic Polymer Ultraviolet Ray Absorbing Agent 21 g of ultraviolet ray absorbing monomer (3) and 9 g of methyl acrylate were dissolved in 150 ml of dioxane. While stirring the resulting solution with heating at 70° C. under nitrogen atmosphere, a solution prepared by dissolving 270 mg of 2,2'-azobis(2,4-dimethylvaleronitrile) in 5 ml of dioxane was added, and the reaction was carried out for 5 hours. Then, the resulting product was poured into 2 liters of ice water, and the solid thus-deposited was collected by filtration and thoroughly washed with water. The product was dried to obtain 23.9 g of the hydrophobic polymer ultraviolet ray absorbing agent. As a result of nitrogen analysis of the hydrophobic polymer ultraviolet ray absorbing agent, it was found that the copolymer synthesized contained 63.1% of the ultraviolet ray absorbing monomer unit.

$$\lambda_{max}^{CH_3COOC_2H_5} = 372 \text{ nm}$$

Synthesis of Ultraviolet Ray Absorbing Polymer Latex (A)

Two solutions (i) and (ii) were prepared in the following manner.

Solution (i): 70 g of a 10% by weight aqueous solution of bone gelatin (pH: 5.6 at 35° C.) was heated to 32° C. to dissolve.

Solution (ii): 5 g of the above-described hydrophobic polymer was dissolved in 20 g of ethyl acetate at 38° C., and 5 ml of a 70% by weight methanol solution of sodium dodecylbenzenesulfonate was added thereto.

Then, solutions (i) and (ii) were put into a mixer with explosion preventing equipment. After stirring for 1 minute at a high speed, the operation of the mixer was stopped and the ethyl acetate was distilled off under a reduced pressure. Thus, polymer latex (A) wherein the hydrophobic polymer ultraviolet ray absorbing agent was dispersed in a diluted aqueous solution of gelatin was obtained.

Synthesis Example 9

Synthesis of Hydrophobic Polymer Ultraviolet Ray Absorbing Agent 63 g of the ultraviolet ray absorbing monomer (1) and 27 g of methyl methacrylate were dissolved in 450 ml of dioxane. While stirring the resulting solution with heating at 70° C. under nitrogen atmosphere, a solution prepared by dissolving 810 mg of 2,2′-azobis(2,4-dimethylvaleronitrile) in 15 ml of dioxane was added, and the reaction was carried out for 5 hours. Then, the resulting product was poured into 5 liters of ice water, and the solid thus-deposited was collected by filtration and thoroughly washed with water and then methanol. The product was dried to obtain 83 g of a hydrophobic polymer ultraviolet ray absorbing agent. As a result of nitrogen analysis of the hydrophobic polymer ultraviolet ray absorbing agent, it was found that the copolymer synthesized contained 67.1% of the ultraviolet ray absorbing monomer unit.

$$\lambda_{max}^{CH_3COOC_2H_5} = 373 \text{ nm}$$

Synthesis of Ultraviolet Ray Absorbing Polymer Latex (B)

Polymer latex (B) was prepared by the same procedure as that for the above-described polymer latex (A).

The ultraviolet ray absorbing polymer latex of the present invention is used by adding it to the hydrophilic colloid layers of silver halide photographic light-sensitive materials, such as a surface protective layer, an intermediate layer or a silver halide emulsion layer, etc. It is preferred to use it in the surface protective layer or the hydrophilic colloid layer adjacent to the surface protective layer. Particularly, it is preferable to add it to the lower layer in the surface protective layer consisting of two layers.

The amount of the ultraviolet ray absorbing polymer latex which is added to the photographic material is not restricted, but it is preferably added in an amount in a range of 10 to 2,000 mg and preferably 50 to 1,000 mg per square meter.

Examples of silver halide photographic light-sensitive materials which can make use of the present invention include color negative films, color reversal films, color papers and color diffusion transfer light-sensitive materials, etc.

In the following, components other than the ultraviolet ray absorbing polymer latex in the silver halide photographic light-sensitive materials of the present invention and processes for development, etc., are described briefly.

As protective colloids for the hydrophilic colloid layers of the present invention, gelatin is advantageously used, but other hydrophilic colloids may be used.

For example, it is possible to use proteins such as gelatin derivatives, graft polymers of gelatin with other high polymers, albumin or casein, etc.; saccharose derivatives such as cellulose derivatives such as hydroxyethyl cellulose, carboxymethyl cellulose or cellulose sulfate, etc., sodium alginate or starch derivatives, etc.; and various synthetic hydrophilic high molecular substances such as homopolymers or copolymers, for example, polyvinyl alcohol, polyvinyl alcohol partial acetal, poly-N-vinylpyrrolidone, polyacrylic acid, polymethacrylic acid, polyacrylamide, polyvinylimidazole or polyvinylpyrazole, etc.

Useful gelatins include lime-processed gelatin as well as acid-processed gelatin and enzyme-processed gelatin as described in *Bull. Soc. Sci. Phot. Japan*, No. 16, page 30 (1966). Further, hydrolyzed products and enzymatic decomposition products of gelatin can be used.

Examples of useful silver halides for the silver halide emulsion layers of the present invention include silver bromide, silver iodobromide, silver iodochlorobromide, silver chlorobromide and silver chloride.

The silver halide emulsions used in the present invention can be prepared by processes described in P. Glafkides, *Chimie et Physique Photographique* (issued by Paul Montel Co., 1967), G. F. Duffin, *Photographic Emulsion Chemistry* (issued by The Focal Press, 1966) and V. L. Zelikman et al., *Making and Coating Photographic Emulsion* (issued by The Focal Press, 1966), etc. Namely, any acid process, neutral process or ammonia process may be used. Further, as a type of reacting soluble silver salts with soluble halogen salts, it is possible to use any one-side mixing process, simultaneous mixing process or combination thereof.

A process for forming silver halide particles in an excess amount of silver ions (the so-called reversal mixing process) can be used, too. As a type of simultaneous mixing process, it is possible to use a process wherein a liquid phase for forming silver halide is kept at a constant pAg, namely, the so-called controlled double jet process.

According to this process, silver halide emulsions having a regular crystal form and a nearly uniform particle size are obtained.

Cadmium salts, zinc salts, lead salts, thallium salts, iridium salts or complex salts thereof, rhodium salts or complex salts thereof, and iron salts or complex salts thereof may be coexistent in the step of forming silver halide particles or the step of physical ageing.

The silver halide emulsions of the present invention can be chemically sensitized by conventional methods.

Namely, it is possible to use a sulfur sensitization process using active gelatin or sulfur containing compounds capable of reacting with silver (for example, thiosulfates, thioureas, mercapto compounds and rhodanines), a reduction sensitization process using reducing substances (for example, stannous salts, amines, hydrazine derivatives, formamidine sulfuric acid and silane compounds) and a noble metal sensitization process using noble metal compounds (for example, gold complex salts and complex salts of metals belonging to Group VIII in the Periodic Table, such as Pt, Ir or Pd, etc.), which may be used alone or as a combination.

In order to prevent fogging when producing the light-sensitive materials, during preservation or during photographic treatment or to stabilize photographic properties, various compounds can be incorporated in the silver halide emulsions of the present invention. Namely, it is possible to add various compounds known as antifogging agents or stabilizers, such as azoles, for example, benzothiazolium salts, nitroindazoles, triazoles, benzotriazoles and benzimidazoles (particularly, nitro- or halogen-substituted derivatives); heterocyclic mercapto compounds, for example, mercaptothiazoles, mercaptobenzothiazoles, mercaptobenzimidazoles, mercaptothiadiazoles, mercaptotetrazoles (particularly, 1-phenyl-5-mercaptotetrazole) and mercaptopyrimidines; the above-described heterocyclic mercapto compounds which have water-soluble groups such as a carboxyl group or a sulfo group, etc.; thioketo compounds, for example, oxazolinethione; azaindenes, for example, tetraazaindenes (particularly, 4-hydroxy-substituted-(1,3,3a,7)tetraazaindenes); benzenethiosulfonic acids; and benzenesulfinic acid; etc.

The hydrophilic colloid layers in the light-sensitive materials of the present invention may contain various surface active agents for various purposes such as coating assistants, prevention of electrically charging, improvement of slipping property, emulsifying and dispersing, prevention of adhesion and improvement of photographic properties (for example, acceleration of development, hard tone, and sensitization), etc.

For example, it is possible to use nonionic surface active agents such as saponin (steroid type), alkylene oxides (for example, polyethylene glycol, polyethylene glycol/polypropylene glycol condensation products, polyethylene glycol alkyl ethers, polyethylene glycol alkylaryl ethers, polyethylene glycol esters, polyethylene glycol sorbitan esters, polyalkylene glycol alkylamines or amides, and polyethylene oxide addition products of silicone), glycidol derivatives (for example, alkenylsuccinic acid polyglycerides and alkylphenol polyglycerides), aliphatic acid esters of polyhydric alcohols, or alkyl esters of saccharose, etc.; anionic surface active agents having acid groups such as a carboxyl group, a sulfo group, a phospho group, a sulfuric acid ester group or a phosphoric acid ester group, etc., such as alkylcarboxylic acid salts, alkylsulfonic acid salts, alkylbenzenesulfonic acid salts, alkylnaphthalenesulfonic acid salts, alkylsulfuric acid esters, alkylphosphoric acid esters, N-acyl-N-alkyltaurines, sulfosuccinic acid esters, sulfoalkyl polyoxyethylene alkyl phenyl esters or polyoxyethylene alkylphosphoric acid esters, etc.; ampholytic surface active agents such as amino acids, aminoalkylsulfonic acids, aminoalkylsulfuric or phosphoric acid esters, alkylbetaines or amineoxides, etc.; and cationic surface active agents such as alkylamine salts, aliphatic or aromatic quaternary ammonium salts, heterocyclic quaternary ammonium salts such as pyridinium salts or imidazolium salts, etc., or aliphatic or heterocyclic phosphonium or sulfonium salts, etc.

The silver halide emulsions of the present invention may be spectrally sensitized by methine dyes or other sensitizing dyes which can be used alone or in various combinations. Combinations of sensitizing dyes are frequently used for the purpose of supersensitization. The emulsion may contain dyes which do not have a spectral sensitization function themselves or substances which do not substantially absorb visible light but have a function of supersensitization, together with the sensitizing dyes.

Useful sensitizing dyes, combinations of dyes having a function of supersensitization and substances having a function of supersensitization have been described in *Research Disclosure*, Vol. 176, 17643 (Dec., 1978), page 23, paragraph IV-J.

The hydrophilic colloid layers such as a silver halide emulsion layer or a surface protective layer in the present invention may contain inorganic or organic hardening agents. For example, it is possible to use chromium salts (chromium alum or chromium acetate, etc.), aldehydes (formaldehyde, glyoxal or glutaraldehyde, etc.), N-methylol compounds (dimethylolurea, or methyloldimethyl hydantoin, etc.), dioxane derivatives (2,3-dihydroxydioxane, etc.), active vinyl compounds (1,3,5-triacryloyl-hexahydro-s-triazine or 1,3-vinylsulfonyl-2-propanol, etc.), active halogen compounds (2,4-dichloro-6-hydroxy-s-triazine, etc.) and mucohalogenic acids (mucochloric acid or mucophenoxychloric acid, etc.), which may be used alone or as a combination.

The photographic light-sensitive materials of the present invention may contain color forming couplers, namely, compounds capable of coloring by oxidative coupling with an aromatic primary amine developing agent (for example, phenylenediamine derivatives or aminophenol derivatives, etc.) by color development. Examples of them include 5-pyrazolone couplers, pyrazolobenzimidazole couplers, cyanoacetylcoumarone couplers and ring-opened acylacetonitrile couplers, etc., as magenta couplers; acylacetamide couplers (for example, benzoylacetanilides and pivaloyl acetanilides), etc., as yellow couplers; and naphthol couplers and phenol couplers, etc., as cyan couplers. These couplers are preferred to have hydrophobic groups called ballast groups in the molecule so as to be non-diffusible. The couplers may be any of 4-equivalence and 2-equivalence to silver ion. Further, they may be colored couplers having an effect of color correction or couplers which release a development inhibitor by development (the so-called DIR couplers).

Further, non-coloring DIR coupling compounds which produce a colorless product by coupling reaction and release a developing inhibitor may be contained in addition to DIR couplers.

The light-sensitive materials of the present invention may contain hydroquinone derivatives, aminophenol derivatives, gallic acid derivatives and ascorbic acid derivatives, etc., as anti-color-fogging agents.

When practicing the present invention, the following known antifading agents can be used together. Further, color image stabilizers used in the present invention may be alone or a combination of two or more thereof. Examples of known antifading agents include hydroquinone derivatives, gallic acid derivatives, p-alkoxyphenols, p-oxyphenol derivatives and bisphenols.

The hydrophilic colloid layers of the photographic light-sensitive materials of the present invention can contain a water-insoluble or nearly insoluble synthetic polymer dispersion for the purpose of improvement of dimensional stability. For example, it is possible to use polymers composed of one or more of alkyl acrylate (or methacrylate), alkoxyalkyl acrylate (or methacrylate), glycidyl acrylate (or methacrylate), acrylamide (or methacrylamide), vinyl ester (for example, vinyl acetate), acrylonitrile, olefin and styrene, etc., and polymers composed of a combination of the above-described monomer components and acrylic acid, methacrylic acid, $\alpha,\beta$-unsaturated dicarboxylic acid, hydroxyalkyl acrylate (or methacrylate), sulfoalkyl acrylate (or methacrylate) or styrenesulfonic acid, etc.

The present invention is suitably applied to multilayer color photographic materials comprising at least two layers having each a different spectral sensitivity on a base. The multilayer color photographic materials generally have at least each a red-sensitive emulsion layer, a green-sensitive emulsion layer and a blue-sensitive emulsion layer on the base. The order of these layers can be suitably selected as occasion demands. Generally, the red-sensitive emulsion layer contains cyan forming couplers, the green-sensitive emulsion layer contains magenta forming couplers and the blue-sensitive emulsion layer contains yellow forming couplers, but other combinations may be adopted, if necessary.

Exposure to light for obtaining photographic images may be carried out by the conventional method. Namely, it is possible to use various known light sources such as natural light (sunlight), a tungsten light, a fluorescent light, a mercury lamp, a xenon arc lamp, a carbon arc lamp, a xenon flash light, or a cathode ray tube flying spot, etc. As exposure time, not only exposure for 1/1,000 second to 1 second which is used for conventional cameras, but also exposure shorter than 1/1,000 second, for example, $1/10^4$ to $1/10^6$ second in case of the xenon flash light or the cathode ray tube, and exposure longer than 1 second can be used. If necessary, the spectral composition of light used for exposure can be controlled by a color filter.

Photographic processings of the light-sensitive materials of the present invention can be carried out by any known methods. Known processing solutions can be used. The processing temperature is generally selected from a range of 18° C. to 50° C., but a temperature lower than 18° C. or a temperature higher than 50° C. may be used, too. Any of a development processing for forming silver images (black-and-white photographic processing) and a color photographic processing comprising a development processing for forming dye images can be adopted as occasion demands.

The developing solution used in case of black-and-white photographic processing may contain known developing agents. Examples of developing agents include dihydroxybenzenes (for example, hydroquinone), 3-pyrazolidones (for example, 1-pehnyl-3-pyrazolidone), aminophenols (for example, N-methyl-p-aminophenol), 1-phenyl-3-pyrazolines, ascorbic acid, and heterocyclic compounds such as those wherein a 1,2,3,4-tetrahydroquinone ring and an indoline ring are condensed as described in U.S. Pat. No. 4,067,872, which can be used alone or as a combination of them. The developing solution generally contains known preservatives, alkali agents, pH buffer agents and antifogging agents, etc. If necessary, it may contain dissolving assistants, toning agents, development accelerators, surface active agents, defoaming agents, water softeners, hardening agents and viscosity increasing agents, etc.

In one special type of development processing, the developing agent may be contained in the light-sensitive material, for example, in an emulsion layer, and the light-sensitive material is developed by processing in an aqueous alkali solution. Among the developing agents, hydrophobic agents can be incorporated in the emulsion layer as a latex dispersion as disclosed in *Research Disclosure*, No. 169 as RD-16928. Such a development processing may be combined with a silver salt stabilization processing using thiocyanates.

Conventional fixing solutions can be used.

Examples of useful fixing agents include thiosulfates, thiocyanates, and known organic sulfur compounds having an effect as a fixing agent.

The fixing solution may contain water-soluble aluminum salts as a hardening agent.

When forming color images, known processes can be utilized.

It is possible to use a negative-positive process (for example, described in *Journal of the Society of Motion Picture and Television Engineers*, Vol. 61 (1953), pages 667-701) and a color reversal process for forming color positive images which comprises forming negative silver images by developing with a developer containing a black-and-white developing agent, subjecting to at least one uniform exposure to light or another suitable fogging treatment, and subsequently carrying out color development, etc.

The color developing solution generally comprises an aqueous alkaline solution containing a color developing agent. As the color developing agent, it is possible to use known primary aromatic amine developing agents, for example, phenylenediamines (for example, 4-amino-N,N-diethylaniline, 3-methyl-4-amino-N,N-diethylaniline, 4-amino-N-ethyl-N-β-hydroxyethylaniline, 3-methyl-4-amino-N-ethyl-N-β-hydroxyethylaniline, 3-methyl-4-amino-N-ethyl-N-β-methanesulfonamidoethylaniline and 4-amino-3-methyl-N-ethyl-N-β-methoxyethylaniline, etc.).

In addition, it is possible to use substances described in L. F. A. Mason, *Photographic Processing Chemistry* (issued by Focal Press, 1966), pages 226-229, U.S. Pat. Nos. 2,193,015 and 2,592,364 and Japanese Patent Application (OPI) No. 64933/73, etc.

The color developing solution may contain pH buffer agents such as sulfites, carbonates, borates and phosphates of aliali metals, and development restrainers or antifogging agents such as bromides, iodides or organic antifogants, etc. Further, it may contain, if desired, water softeners, preservatives such as hydroxylamine, organic solvents such as benzyl alcohol or diethylene glycol, development accelerators such as polyethylene glycol, quaternary ammonium salts or amines, dye forming couplers, competing couplers, fogging agents such as sodium borohydride, auxiliary developing agents such as 1-phenyl-3-pyrazolidone, viscosity imparting agents, polycarboxylic acid type chelating agents described in U.S. Pat. No. 4,083,723 and antioxidants described in German Patent Application (OLS) No. 2,622,950, etc.

The photographic emulsion layers after color development are generally subjected to bleaching processing. The bleaching processing may be carried out simultaneously with fixation processing or may be carried out respectively. As bleaching agents, compounds of polyvalence metals such as iron (III), cobalt (III), chromium (VI) or copper (II), peracids, quinones and nitroso compounds, etc., are used. For example, it is possible to use ferricyanides, bichromates, organic complex salts of iron (III) or cobalt (III), for example, complex salts of aminopolycarboxylic acids such as ethylenediaminetetraacetic acid, nitrilotriacetic acid or 1,3-diamino-2-propanol tetraacetic acid, etc., and organic acids such as citric acid, tartaric acid or malic acid, etc.; persulfates, permanganates; and nitrosophenols, etc. Among them, potassium ferricyanide, sodium ethylenediaminetetraacetato iron (III) complex and ammonium ethylenediaminetetraacetato iron (III) complex are particularly useful. Ethylenediaminetetraacetato iron (III) complexes are useful for both of the bleaching solution and the mono bath bleach-fixing solution.

In the following, the present invention is illustrated in greater detail with reference to examples.

EXAMPLE 1

In order to compare Polymer Latexes (A) and (B) prepared in Synthesis Examples 8 and 9 with Monomer (1) and an ultraviolet ray absorbing agent having the following structure (29), Emulsified Dispersions (C) and (D) containing the Compounds (1) and (29), respectively, were prepared in the following manner.

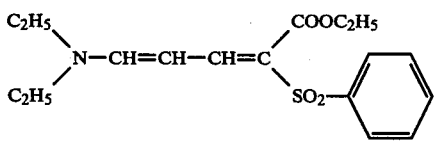

29

Two kinds of solutions (i) and (ii) were prepared in the following manner.

Solution (i): 1,000 g of a 10% by weight aqueous solution of bone gelatin (pH: 5.6 at 35° C.) was heated to 40° C. to dissolve.

Solution (ii): 68.5 g of the above-described Monomer (1) was dissolved in a solvent mixture composed of 80 g of dibutyl phthalate and 300 g of ethyl acetate as an auxiliary solvent at 38° C., and 51 g of a 72% by weight methanol solution of sodium dodecylbenzenesulfonate was added to the resulting solution.

Then, solutions (i) and (ii) were put into a mixer with explosion preventing equipment. After being stirred for 1 minute at a high speed, the operation of the mixer was stopped and the ethyl acetate was distilled off under a reduced pressure. Thus, an Emulsified Dispersion (C) pf Monomer (1) was prepared.

Emulsified Dispersion (D) was prepared using 65.3 g of Compound (29) in the same procedure as in Emulsified Dispersion (C).

When carrying out emulsification of the Compounds (1) and (29), if dibutyl phthalate was not used, coarse crystals were separated within a very short time after emulsification, whereby not only the ultraviolet ray absorbing property varied but also the coating property remarkably deteriorated.

Figure 1B:
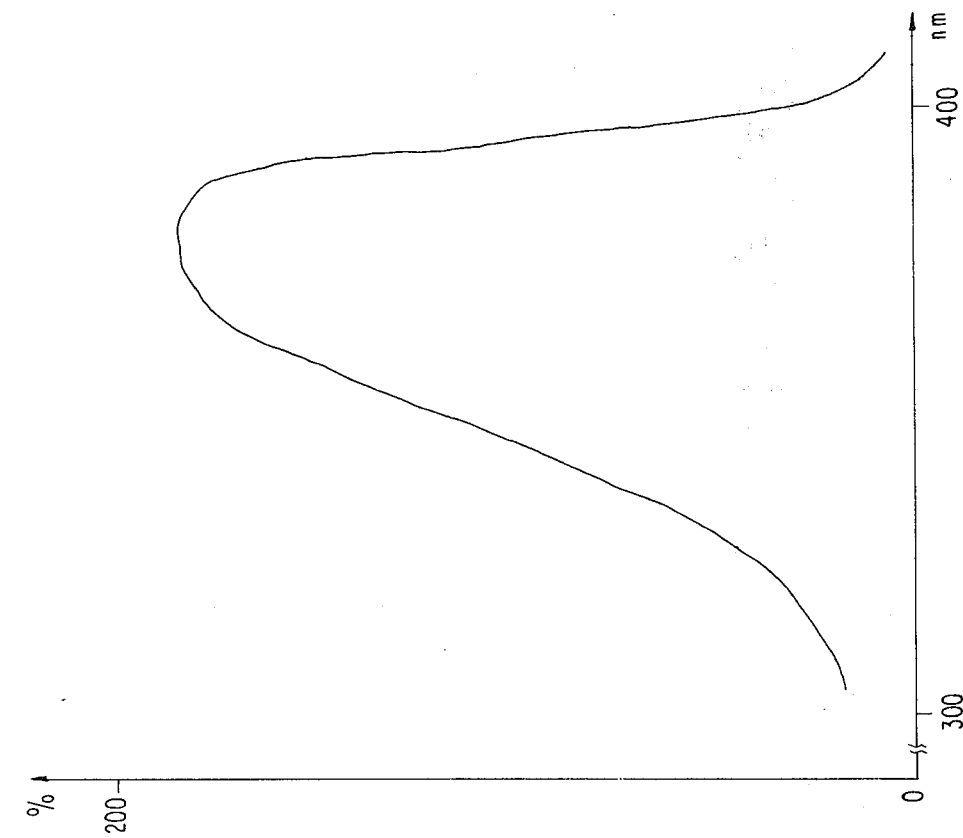

Spectral absorption characteristics of samples which were prepared by applying the above-described emulsified dispersions to a cellulose triacetate support in an amount of 4.0 g/m², respectively, were measured by means of a Hitachi 323 type self-recording spectrodensitometer, and the results shown in FIGS. 1 (a, b, c and d) were obtained.

It is apparent from FIGS. 1 (a, b, c and d) that the absorption peaks of (A) and (B) are maintained surprisingly sharp as compared with (C) and (D), in spite of polymer latexes.

The results shown in FIG. 1 are surprising matters, because it has been believed generally that the spectral absorption peak of a polymer obtained by polymerization of the monomer is broader than that of the monomer and such polymer cannot be practically used as a photographic ultraviolet ray absorbing agent.

EXAMPLE 2

A multilayer color photographic light-sensitive material comprising layers having the compositions described below on a cellulose triacetate film support was prepared.

The 1st Layer: Antihalation layer (AHL)
A gelatin layer containing black colloidal silver.

The 2nd Layer: Intermediate layer (ML)
A gelatin layer containing an emulsified dispersion of 2,5-di-tert-octylhydroquinone.

The 3rd Layer: The first red-sensitive emulsion layer (RL$_1$)
Silver iodobromide emulsion (silver iodide: 5% by mol). Amount of silver coated: 1.79 g/m²
Sensitizing dye I: $6 \times 10^{-5}$ mol per mol of silver
Sensitizing dye II: $1.5 \times 10^{-5}$ mol per mol of silver
Coupler A: 0.04 mol per mol of silver
Coupler C-1: 0.0015 mol per mol of silver
Coupler C-2: 0.0015 mol per mol of silver
Coupler D: 0.0006 mol per mol of silver The 4th Layer: The second red-sensitive emulsion layer (RL$_2$)
Silver iodobromide emulsion (silver iodide: 4% by mol). Amount of silver coated: 1.4 g/m²
Sensitizing dye I: $3 \times 10^{-5}$ mol per mol of silver
Sensitizing dye II: $1.2 \times 10^{-5}$ mol per mol of silver
Coupler A: 0.02 mol per mol of silver
Coupler C-1: 0.0008 mol per mol of silver
Coupler C-2: 0.0008 mol per mol of silver The 5th Layer: Intermediate layer (ML)
The same as the 2nd layer.

The 6th Layer: The first green-sensitive emulsion layer (GL$_1$)
Silver iodobromide emulsion (silver iodide: 4% by mol). Amount of silver coated: 1.5 g/m²
Sensitizing dye III: $3 \times 10^{-5}$ mol per mol of silver
Sensitizing dye IV: $1 \times 10^{-5}$ mol per mol of silver
Coupler B: 0.05 mol per mol of silver
Coupler M-1: 0.008 mol per mol of silver
Coupler D: 0.0015 mol per mol of silver The 7th Layer: The second green-sensitive emulsion layer (GL$_2$)
Silver iodobromide emulsion (silver iodide: 5% by mol). Amount of silver coated: 1.6 g/m²
Sensitizing dye III: $2.5 \times 10^{-5}$ mol per mol of silver
Sensitizing dye IV: $0.8 \times 10^{-5}$ mol per mol of silver
Coupler B: 0.02 mol per mol of silver
Coupler M-1: 0.003 mol per mol of silver
Coupler D: 0.0003 mol per mol of silver The 8th Layer: Yellow filter layer (YFL)
A gelatin layer containing yellow colloidal silver and an emulsified dispersion of 2,5-di-tert-octylhydroquinone in an aqueous solution of gelatin.

The 9th Layer: The first blue-sensitive emulsion layer (BL$_1$)
Silver iodobromide emulsion (silver iodide: 6% by mol). Amount of silver coated: 1.5 g/m²
Coupler Y-1: 0.25 mol per mol of silver The 10th Layer: The second blue-sensitive emulsion layer (BL$_2$)
Silver iodobromide (silver iodide: 6% by mol). Amount of silver coated: 1.1 g/m²
Coupler Y-1: 0.06 mol per mol of silver The 11th Layer: Protective layer (PL)
A gelatin layer containing polymethyl methacrylate particles (particle size: about 1.5μ)

In addition to the above-described compositions, a gelatin hardener and a surface active agent were added to each layer.

Compounds used for preparing the samples:
Sensitizing dye I: Anhydro-5,5'-dichloro-3,3'-di(γ-sulfopropyl)-9-ethylthiacarbocyanine hydroxide pyridinium salt.
Sensitizing dye II: Anhydro-9-ethyl-3,3'-di(γ-sulfopropyl)-4,5,4',5'-dibenzothiacarbocyanine hydroxide triethylamine salt.
Sensitizing dye III: Anhydro-9-ethyl-5,5'-dichloro-3,3'-di(γ-sulfopropyl)oxacarbocyanine sodium salt.
Sensitizing dye VI: Anhydro-5,6,5',6'-tetrachloro-1,1'-diethyl-3,3'-di{β-[β-(γ-sulfopropoxy)ethoxy]-ethyl-}imidazolocarbocyanine hydroxide sodium salt.

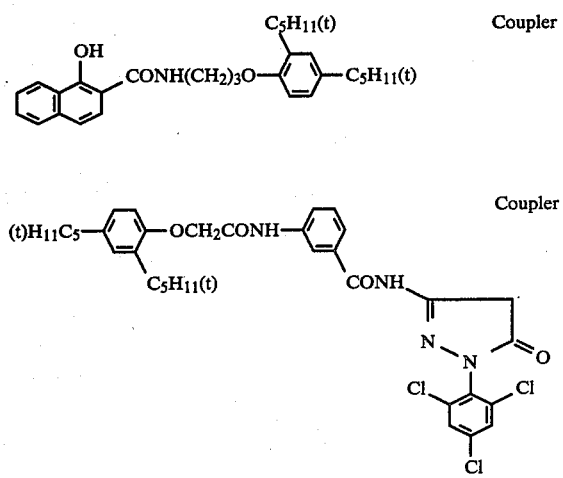

Coupler A

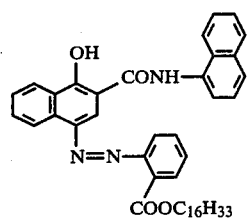

Coupler B

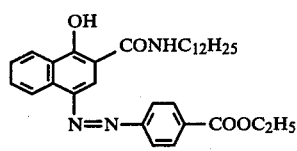

Coupler C-1

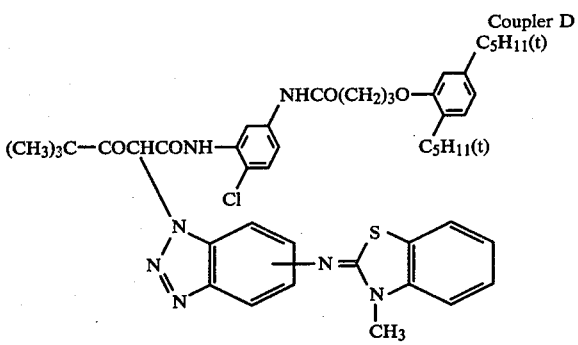

Coupler C-2

Coupler D

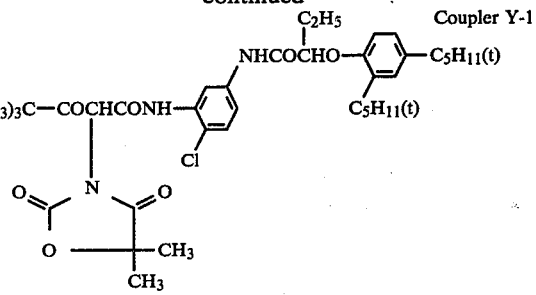

Coupler M-1

Coupler Y-1

The above-described sample was designated Sample I. To the protective layer of Sample I, Dmulsified Dispersions (A), (B), (C) and (D) used in Example 1 were added in a coating amount of 4.0 g/m², respectively, to prepare Samples II, III, IV and V.

With respect to these samples, a film property, an anti-adhesive property and image sharpness were measured by the following methods, and results shown in Table 1 below were obtained.

(a) Film Property

After a strip of the sample was immersed in a color developing solution for processing CN-16 (manufactured by Fuji Photo Film Co., Ltd.) at 25° C. for 5 minutes, it was then scratched by means of a scratch strength tester equipped with a sapphire pin having a diameter of 0.1 mm to which a weight of 0 to 200 g was continuously applied, and film strength was examined by measuring the weight by which a scratch began to be made.

(b) Antiadhesion Test

A sample was cut in a size of 35 square mm. After the strips were conditioned for 1 day under a condition of 25° C. and 90% RH in such a state that each of them did not contact one another, they were preserved in such a state that the emulsion face was in contact with the back face under a condition of 40° C. and 90% RH for 2 days while applying a weight of 500 g. The films taken out were separated and the % area of the adhesion part was measured.

Valuations A to D are as follows.
  A. Adhesion area: 0–40%
  B. Adhesion area: 40–60%
  C. Adhesion area: 60–80%

(c) Image Sharpness

Image sharpness was determined by obtaining a response function (modulation transfer function; which is referred to as MTF, hereinafter) and comparing MTF values in a certain frequency. Measurement of MTF was carried out according to the method described in Masao Takano and Ikuo Fujimura, *Hihakaikensa*, Vol. 6, pages 472–482, (1967). Exposure was carried out using white light, and measurements in R, G and B layers were carrid out through red, green and blue filters, respectively. Development was carried out using the following processings.
  1. Color development: 3 minutes and 15 seconds
  2. Bleaching: 6 minutes and 30 seconds
  3. Washing with water: 3 minutes and 15 seconds
  4. Fixing: 6 minutes and 30 seconds
  5. Washing with water: 3 minutes and 15 seconds
  6. Stabilizing: 3 minutes and 15 seconds The compositions of the processing solutions used in each step were as follows.

Color Developing Solution:
Sodium nitrilotriacetate: 1.0 g
Sodium sulfite: 4.0 g
Sodium carbonate: 30.0 g
Potassium bromide: 1.4 g
Hydroxylamine sulfate: 2.4 g
4-(N-ethyl-N-β-hydroxyethylamino)-2-methylaniline sulfate: 4.5 g
Water to make: 1 liter Bleaching Solution:
Ammonium bromide: 160.0 g
Aqueous ammonia solution (28%): 25.0 ml
Sodium ethylenediaminetetraacetato iron complex: 130.0 g
Glacial acetic acid: 14.0 ml
Water to make: 1 liter Fixing Solution:
Sodium tetrapolyphosphate: 2.0 g
Sodium sulfite: 4.0 g
Ammonium thiosulfate (70%): 175.0 ml
Sodium bisulfite: 4.6 g
Water to make: 1 liter Stabilizing Solution:
Formalin: 8.0 m
Water to make: 1 liter In Table 1 below, MTF values in a frequency of 20 per mm are shown. The value being larger means that reproduction of fine parts of images is more excellent, namely, image sharpness is higher.

TABLE 1

| | Sample | | | | |
|---|---|---|---|---|---|
| Item Examined | I (Blank) | II (This Invention) | III (This Invention) | IV (Comparison) | V (Comparison) |
| Film Strength | 180 g | 172 g | 175 g | 49 g | 52 g |
| Antiadhesion | A | A | A | C | C |
| MTF Value(%) | | | | | |
| R | 75 | 73 | 74 | 71 | 68 |
| G | 83 | 82 | 82 | 75 | 75 |
| B | 90 | 88 | 87 | 81 | 80 |

It is apparent from the results shown in Table 1 that the photographic light-sensitive materials using the polymer ultraviolet ray absorbing agents of the present invention are greatly improved in film strength and antiadhesive property as compared with those using Compounds (1) and (29), and they show excellent sharpness. Of course, since Sample I does not contain the ultraviolet ray absorbing agent, it cannot be practically used because it has very inferior color reproduction properties, etc., as compared with Samples II and III.

EXAMPLE 3

In Examples 1 and 2, the ultraviolet ray absorbing polymers were emulsified to prepare latexes. However, it is possible to add the ultraviolet ray absorbing agent directly to the protective layer as a latex prepared as described in Synthesis Examples 4 and 5.

Samples (e) and (f) were prepared by adding the compound of Synthesis Example 4 (referred to as P-4) and the compound of Synthesis Example 5 (referred to as P-31) into the same composition of the protective layer of Sample I in Example 2 respectively and coating the resulting composition on a cellulose triacetate film support in a coating amount of 3.2 cc/m² and 10.1 cc/m², respectively.

Figure 2F:
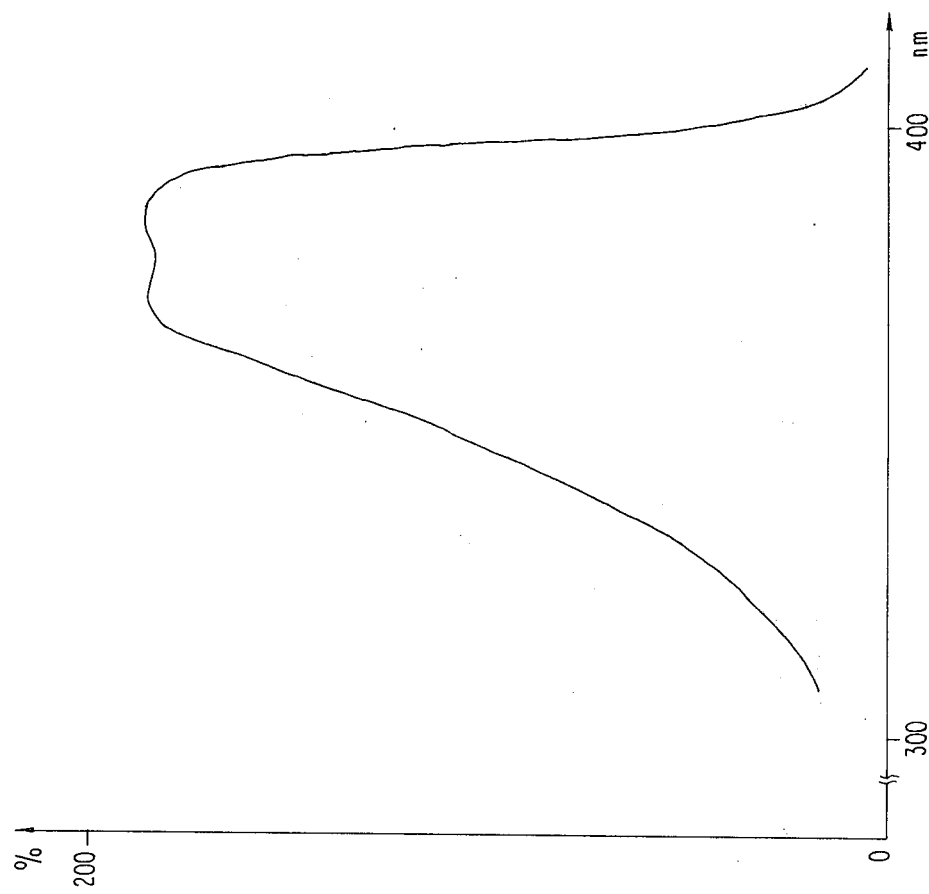
Figure 2E:
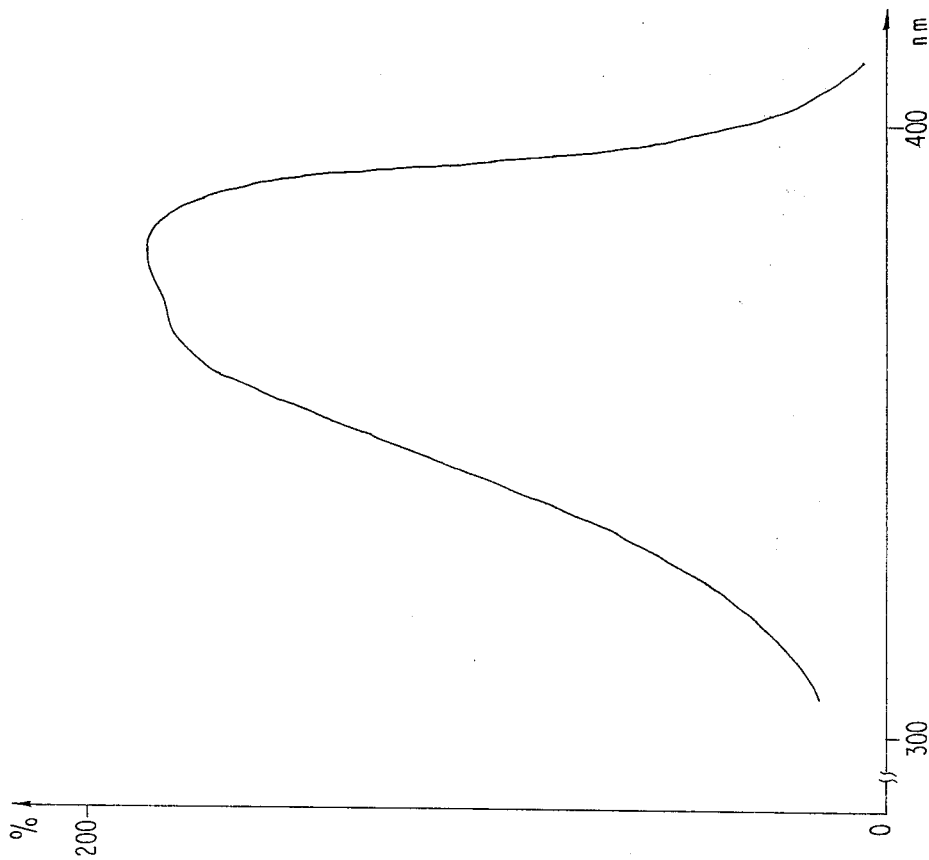

The spectral absorption characteristics of Samples (e) and (f) are shown in FIG. 2.

It is apparent from FIG. 2 that Samples (e) and (f) each has a sharp absorption characteristic in spite of the polymers.

Further, Sample I of the multilayer color photographic light-sensitive material in Example 2 and Samples VI and VII in which the protective layers of Samples (e) and (f) described above were used in place of the protective layer of Sample I were compared and the results are shown in Table 2 below.

It is apparent from the results shown in Table 2 that the photographic light-sensitive materials using the latexes of the present invention are greatly improved in film strength and antiadhesive property as compared with that using Compound (29), and they show excellent sharpness.

TABLE 2

| | Sample | | | |
|---|---|---|---|---|
| Item Examined | I (Blank) | VII (This Invention) | VI (This Invention) | V (Comparison) |
| Film Strength | 180 g | 175 g | 178 g | 52 g |
| Antiadhesion | A | A | A | C |
| MTF Value(%) | | | | |
| R | 75 | 74 | 73 | 68 |
| G | 83 | 81 | 81 | 75 |
| B | 90 | 89 | 87 | 80 |

While the invention has been described in detail and with reference to specific embodiments thereof, it will be apparent to one skilled in the art that various changes and modifications can be made therein without departing from the spirit and scope thereof.

What is claimed is:

1. A silver halide photographic light-sensitive material comprising a support having thereon at least one light-sensitive silver halide emulsion layer and at least one light-insensitive layer, the photographic light-sensitive material containing an ultraviolet ray absorbing polymer latex which comprises a homopolymer or a copolymer having a repeating unit derived from a monomer represented by the following general formula (I):

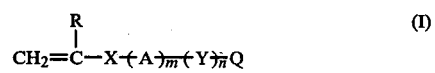

wherein R represents a hydrogen atom, a lower alkyl group having from 1 to 4 carbon atoms or a chlorine atom; X represents —CONH—, —COO— or a phenylene group; A represents a linking group selected from an alkylene group having from 1 to 20 carbon atoms or an arylene group having from 6 to 20 carbon atoms; Y represents —COO—, —OCO—, —CONH—, —NHCO—, —SO₂NH—, —NHSO₂—, —SO₂— or —O—; m represents 0 or an integer of 1; n represents 0 or an integer of 1; and Q represents an ultraviolet ray absorbing group represented by the following general formula (II):

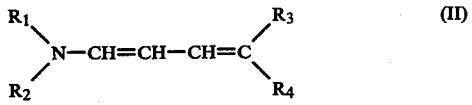

wherein $R_1$ and $R_2$, which may be the same or different, each represents a hydrogen atom, an alkyl group having from 1 to 20 carbon atoms or an aryl group having from 6 to 20 carbon atoms, provided that the both of $R_1$ and $R_2$ do not simultaneously represent hydrogen atoms, and further $R_1$ and $R_2$ may combine to form an atomic group necessary to form a cyclic amino group; $R_3$ represents a cyano group, —$COOR_5$, —$CONHR_5$, —$COR_5$ or —$SO_2R_5$; and $R_4$ represents a cyano group, —$COOR_6$, —$CONHR_6$, —$COR_6$ or —$SO_2R_6$; wherein $R_5$ and $R_6$ each represents an alkyl group having from 1 to 20 carbon atoms or an aryl group having from 6 to 20 carbon atoms, and further $R_5$ and $R_6$ may combine to form an atomic group necessary to form a 1,3-dioxocyclohexane nucleus, a barbituric acid nucleus, a 1,2-diaza-3,5-dioxocyclopentane nucleus or a 2,4-diaza-1-alkoxy-3,5-dioxocyclohexene nucleus; and at least one of $R_1$, $R_2$, $R_3$ and $R_4$ bonds to the vinyl group through the linking group.

2. A silver halide photographic light-sensitive material as claimed in claim 1, wherein $R_1$ and $R_2$ each represents an alkyl group having from 1 to 20 carbon atoms, $R_3$ represents a cyano group or —$SO_2R_5$, $R_4$ represents a cyano group or —$COOR_6$, and $R_5$ and $R_6$ each represents an alkyl group having from 1 to 20 carbon atoms or an aryl group having from 6 to 20 carbon atoms.

3. A silver halide photographic light-sensitive material as claimed in claim 1, wherein $R_1$ and $R_2$ each represents an alkyl group having from 1 to 6 carbon atoms, $R_3$ represents —$SO_2R_5$, $R_4$ represents —$COOR_6$, $R_5$ represents a phenyl group which may be substituted, and $R_6$ represents an alkyl group having from 1 to 20 carbon atoms.

4. A silver halide photographic light-sensitive material as claimed in claim 1, wherein the ultraviolet ray absorbing polymer latex comprises a homopolymer having a repeating unit derived from the monomer represented by the general formula (I).

5. A silver halide photographic light-sensitive material as claimed in claim 1, wherein the ultraviolet ray absorbing polymer latex comprises a copolymer of the monomer represented by the general formula (I) with a copolymerizable monomer.

6. A silver halide photographic light-sensitive material as claimed in claim 5, wherein the copolymerizable monomer is an acrylic acid ester, an acrylic acid amide, a vinyl ester, an acrylonitrile, an aromatic vinyl compound, itaconic acid, citraconic acid, crotonic acid, vinylidene chloride, a vinyl alkyl ether, a maleic acid ester, N-vinylpyrrolidone, N-vinylpyridine, or 2- or 4-vinylpyridine.

7. A silver halide photographic light-sensitive material as claimed in claim 5, wherein the copolymerizable monomer is an acrylic acid ester, a methacrylic acid ester or an aromatic vinyl compound.

8. A silver halide photographic light-sensitive material as claimed in claim 1, wherein the ultraviolet ray absorbing polymer latex is a latex prepared by emulsion polymerization of monomers comprising the monomer represented by the general formula (I).

9. A silver halide photographic light-sensitive material as claimed in claim 1, wherein the ultraviolet ray absorbing polymer latex is a latex prepared by dissolving a hydrophobic polymer ultraviolet ray absorbing agent obtained by polymerization of monomers comprising the monomer represented by the general formula (I) in an organic solvent and then dispersing the solution in a latex form in an aqueous gelatin solution.

10. A silver halide photographic light-sensitive material as claimed in claim 1, wherein the amount of the ultraviolet ray absorbing agent portion in the polymer latex is from 5 to 100% by weight.

11. A silver halide photographic light-sensitive material as claimed in claim 1, wherein the amount of the ultraviolet ray absorbing agent in the polymer latex is from 50 to 100% by weight.

12. A silver halide photographic light-sensitive material as claimed in claim 1, wherein the ultraviolet ray absorbing polymer latex is present in a surface protective layer, an intermediate layer or a silver halide emulsion layer.

13. A silver halide photographic light-sensitive material as claimed in claim 1, wherein the ultraviolet ray absorbing polymer latex is present in a surface protective layer or a hydrophilic colloid layer adjacent to the surface protective layer.

14. A silver halide photographic light-sensitive material as claimed in claim 13, wherein the surface protective layer is composed of two separate layers and the lower layer thereof contains the ultraviolet ray absorbing polymer latex.

15. A silver halide photographic light-sensitive material as claimed in claim 1, wherein the ultraviolet ray absorbing polymer latex is present in an amount within the range of 10 to 2,000 mg/m$^2$ of the material.

16. A silver halide photographic light-sensitive material as claimed in claim 1, wherein the ultraviolet ray absorbing polymer latex is present in an amount within the range of 50 to 1,000 mg/m$^2$ of the material.

17. A silver halide photographic light-sensitive material as claimed in claim 1, wherein the ultraviolet ray absorbing polymer latex is present in the light-sensitive silver halide emulsion layer.

18. A silver halide photographic light-sensitive material as claimed in claim 1, wherein the ultraviolet ray absorbing polymer latex is present in the light-insensitive layer.

19. A silver halide photographic light-sensitive material as claimed in claim 1, further comprising a surface protective layer containing the ultraviolet ray absorbing polymer latex.

20. A silver halide photographic light-sensitive material as claimed in claim 17, wherein the ultraviolet ray absorbing polymer latex is present in an amount of 10 to 2,000 mg/m$^2$ of material.

21. A silver halide photographic light-sensitive material as claimed in claim 20, wherein the ultraviolet ray absorbing polymer latex is present in the silver halide layer in an amount of from 50 to 1,000 mg/m$^2$ of material.

22. A multilayer color photographic light-sensitive material comprising a support having thereon a red-sensitive silver halide emulsion layer containing a cyan forming coupler, a green-sensitive silver halide emulsion layer containing a magenta forming coupler, a blue-sensitive silver halide emulsion layer containing a yellow coupler and a surface protective layer containing an ultraviolet ray absorbing polymer latex which comprises a homopolymer or a copolymer having a repeating unit derived from a monomer represented by the following general formula (I):

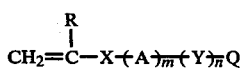

wherein R represents a hydrogen atom, a lower alkyl group having from 1 to 4 carbon atoms or a chlorine atom; X represents —CONH—, —COO— or a phenylene group; A represents a linking group selected from an alkylene group having from 1 to 20 carbon atoms or an arylene group having from 6 to 20 carbon atoms; Y represents —COO—, —OCO—, —CONH—, —NHCO—, —SO$_2$NH—, —NHSO$_2$—, —SO$_2$— or —O—; m represents 0 or an integer of 1; n represents 0 or an integer of 1; and Q represents an ultraviolet ray absorbing group represented by the following general formula (II):

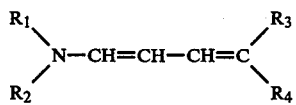

wherein $R_1$ and $R_2$, which may be the same or different, each represents a hydrogen atom, an alkyl group having from 1 to 20 carbon atoms or an aryl group having from 6 to 20 carbon atoms, provided that the both of $R_1$ and $R_2$ do not simultaneously represent hydrogen atoms, and further $R_1$ and $R_2$ may combine to form an atomic group necessary to form a cyclic amino group; $R_3$ represents a cyano group, —COOR$_5$, —CONHR$_5$, —COR$_5$ or —SO$_2$R$_5$; and $R_4$ represents a cyano group, —COOR$_6$, —CONHR$_6$, —COR$_6$ or —SO$_2$R$_6$; wherein $R_5$ and $R_6$ each represents an alkyl group having from 1 to 20 carbon atoms or an aryl group having from 6 to 20 carbon atoms, and further $R_5$ and $R_6$ may combine to form an atomic group necessary to form a 1,3-dioxocyclohexane nucleus, a barbituric acid nucleus, a 1,2-diaza-3,5-dioxocyclopentane nucleus or a 2,4-diaza-1-alkoxy-3,5-dioxocyclohexene nucleus; and at least one of $R_1$, $R_2$, $R_3$ and $R_4$ bonds to the vinyl group through the linking group.

23. A multilayer color photographic light-sensitive material as claimed in claim 22, wherein the ultraviolet ray absorbing polymer latex is present in the silver halide emulsion layers in a total amount of 50 to 1,000 mg/m$^2$ of material.

* * * * *